US011468650B2

(12) United States Patent
Ramani et al.

(10) Patent No.: US 11,468,650 B2
(45) Date of Patent: Oct. 11, 2022

(54) SYSTEM AND METHOD FOR AUTHORING AUGMENTED REALITY STORYTELLING EXPERIENCES INCORPORATING INTERACTIVE PHYSICAL COMPONENTS

(71) Applicant: Purdue Research Foundation, West Lafayette, IN (US)

(72) Inventors: Karthik Ramani, West Lafayette, IN (US); Terrell Kendall Glenn, Sagamore Hills, OH (US); Caleb Carithers, Greer, SC (US); Ananya Ipsita, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/223,287

(22) Filed: Apr. 6, 2021

(65) Prior Publication Data
US 2021/0312715 A1     Oct. 7, 2021

Related U.S. Application Data

(60) Provisional application No. 63/005,710, filed on Apr. 6, 2020.

(51) Int. Cl.
*G06T 19/00* (2011.01)
*G06F 8/34* (2018.01)
(Continued)

(52) U.S. Cl.
CPC ........ *G06T 19/006* (2013.01); *G06F 3/04815* (2013.01); *G06F 8/34* (2013.01); *G06T 13/40* (2013.01)

(58) Field of Classification Search
None
See application file for complete search history.

(56) References Cited

U.S. PATENT DOCUMENTS 9,352,213 B2 *   5/2016  Yim .................. G06F 3/038
10,281,987 B1 *  5/2019  Yang ............... G06F 3/04847
(Continued)

OTHER PUBLICATIONS

Adafruit. 2019. Adafruit HUZZAH32—ESP32 Feather Board, https://www.adafruit.com/product/3591. (2019).
(Continued)

*Primary Examiner* — Jason A Pringle-Parker
(74) *Attorney, Agent, or Firm* — Maginot, Moore & Beck LLP

(57) ABSTRACT

A unique storytelling system is disclosed herein in which a plug-and-play hardware platform with an integrated augmented reality (AR) environment brings stories to life. The storytelling system includes an electronics toolkit and a structure toolkit which enable the user to prototype interactive physical devices for storytelling. The interactive physical devices crafted by the user are easily programmed using a simple visual programing environment of the storytelling system. Additionally, a story event planning tool of the storytelling system enables the user to create customized interactions between the interactive physical devices and virtual AR objects, such as virtual AR avatars or the like. Finally, an AR storytelling application of the storytelling system utilizes an AR device, such as a smartphone, to bring the interactive physical devices to life and enable the user to tell stories using the custom interactions that he or she created.

18 Claims, 10 Drawing Sheets

(51) Int. Cl.
  G06F 3/04815 (2022.01)
  G06T 13/40 (2011.01)

(56) References Cited

U.S. PATENT DOCUMENTS

| | | | |
|---|---|---|---|
| 10,950,051 B2* | 3/2021 | Michalscheck | G05B 19/409 |
| 2015/0323993 A1* | 11/2015 | Levesque | G02B 27/0172 345/156 |
| 2016/0313902 A1* | 10/2016 | Hill | G06F 3/0482 |
| 2016/0342318 A1* | 11/2016 | Melchner | G06F 8/34 |

OTHER PUBLICATIONS

Karan Ahuja, Sujeath Pareddy, Robert Xiao, Mayank Goel, and Chris Harrison. 2019. LightAnchors: Appropriating Point Lights for Spatially-Anchored Augmented Reality Interfaces. In Proceedings of the 32nd Annual ACM Symposium on User Interface Software and Technology (UIST '19). Association for Computing Machinery, New York, NY, USA, 189-196. DOI:http://dx.doi.org/10.1145/3332165.3347884.

Houman Alborzi, Joe Hammer, Alex Kruskal, Abby Lal, Thomas Plaisant Schwenn, Lauren Sumida, Rebecca Wagner, Jim Hendler, Allison Druin, Jaime Montemayor, Michele Platner, Jessica Porteous, Lisa Sherman, Angela Boltman, Gustav Taxén, and Jack Best. 2000. Designing StoryRooms: interactive storytelling spaces for children. In Proceedings of the conference on Designing interactive systems processes, practices, methods, and techniques—DIS00. ACM Press, New York City, New York, United States, 95-104. DOI: http://dx.doi.org/10.1145/347642.347673.

Arduino. 2019. Arduino. https://www.arduino.cc/. (2019).

Zain Asgar, Joshua Chan, Chang Liu, and Paulo Blikstein. 2011. LightUp: a low-cost, multi-age toolkit for learning and prototyping electronics. In Proceedings of the 10th International Conference on Interaction Design and Children. ACM, 225-226.

Carlos Pereira Atencio. 2019. carlosperate/ardublockly. (Sep. 2019). https://github.com/carlosperate/ardublocklyoriginal-date: Jul. 24, 2014T17:37:47Z.

Connelly Barnes, David E. Jacobs, Jason Sanders, Dan B Goldman, Szymon Rusinkiewicz, Adam Finkelstein, and Maneesh Agrawala. 2008. Video puppetry: a performative interface for cutout animation. In ACM SIGGRAPH Asia 2008 papers on—SIGGRAPH Asia '08. ACM Press, Singapore, 1. DOI: http://dx.doi.org/10.1145/1457515.1409077.

Oliver Bimber, L. Miguel Encarna cão, and Dieter Schmalstieg. 2003. The virtual showcase as a new platform for augmented reality digital storytelling. In Proceedings of the workshop on Virtual environments 2003—EGVE '03. ACM Press, Zurich, Switzerland, 87-95. DOI:http://dx.doi.org/10.1145/769953.769964.

Blockly Duino 2019. BlocklyDuino is a web-based visual programming editor for arduino. (2019). Retrieved Sep. 9, 2019 from https://github.com/BlocklyDuino/BlocklyDuino.

Blynk 2019. Control an Arduino with Your Smartphone via Blynk. (2019). Retrieved Sep. 9, 2019 from https://makezine.com/2015/07/06/control-arduino-your-smartphone-via-blynk/.

J. Cassell and K. Ryokai. 2001. Making Space for Voice: Technologies to Support Children's Fantasy and Storytelling. Personal and Ubiquitous Computing 5, 3 (Aug. 2001), 169-190. DOI: http://dx.doi.org/10.1007/PL00000018.

Joshua Chan, Tarun Pondicherry, and Paulo Blikstein. 2013. LightUp: An Augmented, Learning Platform for Electronics. In Proceedings of the 12th International Conference on Interaction Design and Children (IDC '13). Association for Computing Machinery, New York, NY, USA, 491-494. DOI: http://dx.doi.org/10.1145/2485760.2485812.

Angela Chang and Cynthia Breazeal. 2011. TinkRBook: shared reading interfaces for storytelling. In Proceedings of the 10th International Conference on Interaction Design and Children—IDC '11. ACM Press, Ann Arbor, Michigan, 145-148. DOI: http://dx.doi.org/10.1145/1999030.1999047.

Subramanian Chidambaram, Yunbo Zhang, Venkatraghavan Sundararajan, Niklas Elmqvist, and Karthik Ramani. 2019. Shape Structuralizer: Design, Fabrication, and User-driven Iterative Refinement of 3D Mesh Models. In Proceedings of the 2019 CHI Conference on Human Factors in Computing Systems—CHI '19. ACM Press, Glasgow, Scotland Uk, 1-12. DOI: http://dx.doi.org/10.1145/3290605.3300893.

Bettina Conradi, Verena Lerch, Martin Hommer, Robert Kowalski, Ioanna Vletsou, and Heinrich Hussmann. 2011. Flow of Electrons: An Augmented Workspace for Learning Physical Computing Experientially. In Proceedings of the ACM International Conference on Interactive Tabletops and Surfaces (ITS '11). Association for Computing Machinery, New York, NY, USA, 182-191. DOI: http://dx.doi.org/10.1145/2076354.2076389.

Elise Deitrick, Joseph Sanford, and R Benjamin Shapiro. 2014. BlockyTalky: A Low-Cost, Extensible, Open Source, Programmable, Networked Toolkit for Tangible Creation. In Proceedings of Conference on Interaction Design for Children—IDC '14. ACM Press, Aarhus, Denmark, 5.

Mira Dontcheva, Gary Yngve, and Zoran Popovic. 2003. Layered acting for character animation. ACM Transactions on Graphics 22, 3 (Jul. 2003), 409. DOI: http://dx.doi.org/10.1145/882262.882285.

Steven Dow, Manish Mehta, Blair MacIntyre, and Michael Mateas. 2007. AR fa cade: an augmented reality interactve drama. In Proceedings of the 2007 ACM symposium on Virtual reality software and technology—VRST '07. ACM Press, Newport Beach, California, 215. DOI:http://dx.doi.org/10.1145/1315184.1315227.

Jerry Alan Fails, Allison Druin, and Mona Leigh Guha. 2010. Mobile collaboration: collaboratively reading and creating children's stories on mobile devices. In Proceedings of the 9th International Conference on Interaction Design and Children—IDC '10. ACM Press, Barcelona, Spain, 20. DOI: http://dx.doi.org/10.1145/1810543.1810547.

Jerry Alan Fails, Allison Druin, and Mona Leigh Guha. 2014. Interactive storytelling: interacting with people, environment, and technology. International Journal of Arts and Technology 7, 1 (2014), 112. DOI: http://dx.doi.org/10.1504/IJART.2014.058946.

Jill Fitzgerald, Dixie Lee Spiegel, and Tamsen Banks Webb. 1985. Development of Children's Knowledge of Story Structure and Content. The Journal of Educational Research 79, 2 (Nov. 1985), 101-108. DOI: http://dx.doi.org/10.1080/00220671.1985.10885658.

Louise P. Flannery, Brian Silverman, Elizabeth R. Kazakoff, Marina Umaschi Bers, Paula Bontá, and Mitchel Resnick. 2013. Designing ScratchJr: support for early childhood learning through computer programming. In Proceedings of the 12th International Conference on Interaction Design and Children—IDC'13. ACM Press, New York, New York, 1-10. DOI: http://dx.doi.org/10.1145/2485760.2485785.

Rubina Freitas and Pedro Campos. 2008. SMART: a SysteM of Augmented Reality for Teaching 2nd Grade Students. British Computer Society (Sep. 2008), 4.

Franca Garzotto and Matteo Forfori. 2006. FaTe2: storytelling edutainment experiences in 2D and 3D collaborative spaces. In Proceeding of the 2006 conference on Interaction design and children—IDC '06. ACM Press, Tampere, Finland, 113. DOI: http://dx.doi.org/10.1145/1139073.1139102.

Franca Garzotto, Paolo Paolini, and Amalia Sabiescu. 2010. Interactive storytelling for children. In Proceedings of the 9th International Conference on Interaction Design and Children—IDC '10. ACM Press, Barcelona, Spain, 356. DOI: http://dx.doi.org/10.1145/1810543.1810613.

Goldiblox 2014. The War on Pink: GoldieBlox Toys Ignite Debate Over What's Good for Girls. (2014). Retrieved Sep. 9, 2019 from https://time.com/3281/goldie-blox-pink-aisle-debate/.

The LEGO Group. 2019a. LEGO. https://www.lego.com/en-us. (2019).

The LEGO Group. 2019b. LEGO Mindstorms, https://www.lego.com/en-us/mindstorms. (2019).

Lynne Hall, Colette Hume, and Sarah Tazzyman. 2016. Five Degrees of Happiness: Effective Smiley Face Likert Scales for Evaluating with Children. In Proceedings of the the 15th International Confer-

(56) References Cited

OTHER PUBLICATIONS ence on Interaction Design and Children—IDC '16. ACM Press, Manchester, United Kingdom, 311-321 DOI: http://dx.doi.org/10.1145/2930674.2930719.

Björn Hartmann, Scott R Klemmer, Michael Bernstein, Leith Abdulla, Brandon Burr, Avi Robinson-Mosher, and Jennifer Gee. 2006. Reflective physical prototyping through integrated design, test, and analysis. In Proceedings of the 19th annual ACM symposium on User interface software and technology. ACM, 299-308.

S. Henderson and S. Feiner. 2010. Opportunistic Tangible User Interfaces for Augmented Reality. IEEE Transactions on Visualization and Computer Graphics 16, 1 (Jan. 2010), 4-16. DOI: http://dx.doi.org/10.1109/TVCG.2009.91.

Microduino Inc. 2012. mCookie. https://microduinoinc.com/mcookie/. (2012).

Within Unlimited Inc. 2019. Wonderscope, http://wonderscope.com/. (2019).

Ben Jelen, Anne Freeman, Mina Narayanan, Kate M. Sanders, James Clawson, and Katie A. Siek. 2019. Craftec: Engaging Older Adults in Making Through a Craft-Based Toolkit System. In Proceedings of the Thirteenth International Conference on Tangible, Embedded, and Embodied Interaction (TEI '19). ACM, New York, NY, USA, 577-587. DOI: http://dx.doi.org/10.1145/3294109.3295636.

Carmen Juan, Raffaela Canu, and Miguel Giménez. 2008. Augmented Reality Interactive Storytelling Systems Using Tangible Cubes for Edutainment. In 2008 Eighth IEEE International Conference on Advanced Learning Technologies. IEEE, Santander, Cantabria, Spain, 233-235. DOI: http://dx.doi.org/10.1109/ICALT.2008.122.

Filiz Kalelioglu. 2015. A new way of teaching programming skills to K-12 students: Code.org. Computers in Human Behavior 52 (Nov. 2015), 200-210. DOI: http://dx.doi.org/10.1016/j.chb.2015.05.047.

Hannes Kaufmann. 2002. Construct3D: an augmented reality application for mathematics and geometry education. In Proceedings of the tenth ACM international conference on Multimedia—Multimedia '02. ACM Press, Juan-les-Pins, France, 656. DOI:http://dx.doi.org/10.1145/641007.641140.

Majeed Kazemitabaar, Jason McPeak, Alexander Jiao, Liang He, Thomas Outing, and Jon E. Froehlich. 2017. MakerWear: A Tangible Approach to Interactive Wearable Creation for Children. In Proceedings of the 2017 CHI Conference on Human Factors in Computing Systems—CHI '17. ACM Press, Denver, Colorado, USA, 133-145. DOI: http://dx.doi.org/10.1145/3025453.3025887.

Caitlin Kelleher, Randy Pausch, and Sara Kiesler. 2007. Storytelling alice motivates middle school girls to learn computer programming. In Proceedings of the SIGCHI conference on Human factors in computing systems—CHI '07. ACM Press, San Jose, California, USA, 1455. DOI:http://dx.doi.org/10.1145/1240624.1240844.

Varsha Koushik, Darren Guinness, and Shaun K. Kane. 2019. StoryBlocks: A Tangible Programming Game to Create Accessible Audio Stories. In Proceedings of the 2019 CHI Conference on Human Factors in Computing Systems—CHI 19. ACM Press, Glasgow, Scotland Uk, 1-12. DOI:http://dx.doi.org/10.1145/3290605.3300722.

LittleBits. 2019. littleBits. https://littlebits.com/. (2019).

Google LLC. 2019. Blockly. (2019). https://developers.google.com/blockly/.

Fei Lu, Feng Tian, Yingying Jiang, Xiang Cao, Wencan Luo, Guang Li, Xiaolong Zhang, Guozhong Dai, and Hongan Wang. 2011. ShadowStory: creative and collaborative digital storytelling inspired by cultural heritage. In Proceedings of the 2011 annual conference on Human factors in computing systems—CHI '11. ACM Press, Vancouver, BC, Canada, 1919. DOI: http://dx.doi.org/10.1145/1978942.1979221.

John Maloney, Mitchel Resnick, Natalie Rusk, Brian Silverman, and Evelyn Eastmond. 2010. The Scratch Programming Language and Environment. ACM Transactions on Computing Education 10, 4 (Nov. 2010), 1-15. DOI:http://dx.doi.org/10.1145/1868358.1868363.

Bard McKinley and Yun-Ling Lee. 2008. Mystorymaker. In Proceeding of the twenty-sixth annual CHI conference extended abstracts on Human factors in computing systems—CHI '08. ACM Press, Florence, Italy, 3219. DOI:http://dx.doi.org/10.1145/1358628.1358834.

Haipeng Mi, Aleksander Krzywinsk, Tomoki Fujita, and Masanori Sugimoto. 2012. RoboTable: An Infrastructure for Intuitive Interaction with Mobile Robots in a Mixed-reality Environment. Adv. in Hum.-Comp. Int. 2012, Article 1 (Jan. 2012), 1 pages. DOI:http://dx.doi.org/10.1155/2012/301608.

Haipeng Mi, Aleksander Krzywinski, Masanori Sugimoto, and Weiqin Chen. 2010. RoboStory: A tabletop mixed reality framework for children's role play storytelling. In Proceedings of the 1st International Workshop on Interactive Storytelling for Children (ACM IDC'10). Association for Computing Machinery, ACM Press, Barcelona, Spain, 5.

Micro:bit 2019. Micro:bit. (2019). Retrieved Sep. 21, 2018 from https://microbit.org/.

Koya Narumi, Steve Hodges, and Yoshihiro Kawahara. 2015. ConductAR: an augmented reality based tool for iterative design of conductive ink circuits. In Proceedings of the 2015 ACM International Joint Conference on Pervasive and Ubiquitous Computing. ACM, 791-800.

Michael Nebeling, Janet Nebeling, Ao Yu, and Rob Rumble. 2018. ProtoAR: Rapid Physical-Digital Prototyping of Mobile Augmented Reality Applications. In Proceedings of the 2018 CHI Conference on Human Factors in Computing Systems—CHI '18. ACM Press, Montreal QC, Canada, 1-12. DOI: http://dx.doi.org/10.1145/3173574.3173927.

Rubina Freitas and Pedro Campos. 2008. SMART: a SysteM of Augmented Reality for Teaching 2nd Grade Students. British Computer Society (Sep. 2008), 4 pages.

Bard McKinley and Yun-Ling Lee. 2008. Mystorymaker. In Proceeding of the twenty-sixth annual CHI conference extended abstracts on Human factors in computing systems—CHI '08. ACM Press, Florence, Italy, 3219. DOI:http://dx.doi.org/10.1145/1358628.1358834. 6 Pages.

Niantic. 2016. Pokemon GO. https://www.pokemongo.com/en-us/. (2016).

Nintendo. 2018. Nintendo Labo. https://labo.nintendo.com/. (2018).

Jing Qian, Jiaju Ma, Xiangyu Li, Benjamin Attal, Haoming Lai, James Tompkin, John F. Hughes, and Jeff Huang. 2019. Portal-Ble: Intuitive Free-Hand Manipulation in Unbounded Smartphone-Based Augmented Reality. In Proceedings of the 32nd Annual ACM Symposium on User Interface Software and Technology (UIST '19). Association for Computing Machinery, New York, NY, USA, 133-145. DOI: http://dx.doi.org/10.1145/3332165.3347904.

Hayes Solos Raffle, Amanda J. Parkes, and Hiroshi Ishii. 2004. Topobo: a constructive assembly system with kinetic memory. In Proceedings of the 2004 conference on Human factors in computing systems—CHI '04. ACM Press, Vienna, Austria, 647-654. DOI: http://dx.doi.org/10.1145/985692.985774.

Raspberry Pi 2019. Teach, Learn, and Make with Raspberry Pi—Raspberry Pi. (2019). Retrieved Sep. 9, 2019 from https://www.raspberrypi.org.

Jun Rekimoto and Yuji Ayatsuka. 2000. CyberCode: designing augmented reality environments with visual tags. In Proceedings of DARE 2000 on Designing augmented reality environments—DARE '00. ACM Press, Elsinore, Denmark, 1-10. DOI: http://dx.doi.org/10.1145/354666.354667.

Mitchel Resnick and Brian Silverman. 2005. Some reflections on designing construction kits for kids. In Proceeding of the 2005 conference on Interaction design and children—IDC '05. ACM Press, Boulder, Colorado, 117-122. DOI: http://dx.doi.org/10.1145/1109540.1109556.

Jasjeet Singh Seehra, Ansh Verma, Kylie Peppler, and Karthik Ramani. 2015. HandiMate: Create and Animate using Everyday Objects as Material. In Proceedings of the Ninth International Conference on Tangible, Embedded, and Embodied Interaction—

(56) References Cited

OTHER PUBLICATIONS

TEI '14. ACM Press, Stanford, California, USA, 117-124. DOI: http://dx.doi.org/10.1145/2677199.268057.

Teddy Seyed, Peli de Halleux, Michal Moskal, James Devine, Joe Finney, Steve Hodges, and Thomas Ball. 2019. MakerArcade: Using Gaming and Physical Computing for Playful Making, Learning, and Creativity. In Extended Abstracts of the 2019 CHI Conference on Human Factors in Computing Systems—CHI EA '19. ACM Press, Glasgow, Scotland Uk, 1-6. DOI:http://dx.doi.org/10.1145/3290607.3312809.

Sowmya Somanath. 2017. 'Making' within Material, Cultural, and Emotional Constraints. Ph.D. Dissertation. University of Calgary.

Sowmya Somanath, Lora Oehlberg, and Ehud Sharlin. 2017. Making despite Material Constraints with Augmented Reality-Mediated Prototyping. Technical Report. Science.

Danae Stanton, Tony Pridmore, Victor Bayon, Helen Neale, Ahmed Ghali, Steve Benford, Sue Cobb, Rob Ingram, Claire O'Malley, and John Wilson. 2001. Classroom collaboration in the design of tangible interfaces for storytelling. In Proceedings of the SIGCHI conference on Human factors in computing systems—CHI '01 ACM Press, Seattle, Washington, United States, 482-489. DOI: http://dx.doi.org/10.1145/365024.365322.

Nancy L Stein. 1978. How children understand stories: a developmental analysis. Champaign, Ill. : University of Illinois at Urbana-Champaign ; Cambridge, Mass 2, No. 69 (Mar. 1978), 68.

Nicolas Villar, Daniel Cletheroe, Greg Saul, Christian Holz, Tim Regan, Oscar Salandin, Misha Sra, Hui-Shyong Yeo, William Field, and Haiyan Zhang. 2018. Project Zanzibar: A Portable and Flexible Tangible Interaction Platform. In Proceedings of the 2018 CHI Conference on Human Factors in Computing Systems (CHI '18). ACM, New York, NY, USA, Article 515, 13 pages. DOI: http://dx.doi.org/10.1145/3173574.3174089.

Torben Wallbaum, Andrii Matviienko, Swamy Ananthanarayan, Thomas Olsson, Wilko Heuten, and Susanne C.J. Boll. 2018. Supporting Communication between Grandparents and Grandchildren through Tangible Storytelling Systems. In Proceedings of the 2018 CHI Conference on Human Factors in Computing Systems—CHI '18. ACM Press, Montreal QC, Canada, 1-12. DOI:http://dx.doi.org/10.1145/3173574.3174124.

Tianyi Wang, Ke Huo, Pratik Chawla, Guiming Chen, Siddharth Banerjee, and Karthik Ramani. 2018. Plain2Fun: Augmenting Ordinary Objects with Interactive Functions by Auto-Fabricating Surface Painted Circuits. In Proceedings of the 2018 Designing Interactive Systems Conference (DIS '18). ACM, New York, NY, USA, 1095-1106. DOI: http://dx.doi.org/10.1145/3196709.3196791.

Karl D.D. Willis, Ivan Poupyrev, and Takaaki Shiratori. 2011. Motionbeam: a metaphor for character interaction with handheld projectors. In Proceedings of the 2011 annual conference on Human factors in computing systems—CHI '11. ACM Press, Vancouver, BC, Canada, 1031. DOI:http://dx.doi.org/10.1145/1978942.1979096.

Karl D. D. Willis, Takaaki Shiratori, and Moshe Mahler. 2013. HideOut: mobile projector interaction with tangible objects and surfaces. In Proceedings of the 7th International Conference on Tangible, Embedded and Embodied Interaction—TEI '13. ACM Press, Barcelona, Spain, 331. DOI: http://dx.doi.org/10.1145/2460625.2460682.

Te-Yen Wu, Jun Gong, Teddy Seyed, and Xing-Dong Yang. 2019. Proxino: Enabling Prototyping of Virtual Circuits with Physical Proxies. In Proceedings of the 32nd Annual ACM Symposium on User Interface Software and Technology. ACM, 121-132.

Yan Xu, Hyungsung Park, and Youngkyun Baek. 2011. A New Approach Toward Digital Storytelling: An Activity Focused on Writing Self-efficacy in a Virtual Learning Environment. Journal of Educational Technology & Society 14, 4 (2011), 12. https://www.jstor.org/stable/10.2307/jeductechsoci.14.4.181.

Sang Ho Yoon, Ansh Verma, Kylie Peppler, and Karthik Ramani. 2015. HandiMate: exploring a modular robotics kit for animating crafted toys. In Proceedings of the 14th International Conference on Interaction Design and Children—IDC 15. ACM Press, Boston, Massachusetts, 11-20. DOI: http://dx.doi.org/10.1145/2771839.2771841.

Zhiying Zhou, Adrian David Cheok, JiunHorng Pan, and Yu Li. 2004. Magic Story Cube: an interactive tangible interface for storytelling. In Proceedings of the 2004 ACM SIGCHI International Conference on Advances in computer entertainment technology—ACE '04. ACM Press, Singapore, 364-365. DOI: http://dx.doi.org/10.1145/1067343.1067404.

John Zimmerman, Jodi Forlizzi, and Shelley Evenson. 2007. Research through design as a method for interaction design research in HCI. In Proceedings of the SIGCHI conference on Human factors in computing systems—CHI '07. ACM Press, San Jose, California, USA, 493. DOI: http://dx.doi.org/10.1145/1240624.1240704.

* cited by examiner

SYSTEM AND METHOD FOR AUTHORING AUGMENTED REALITY STORYTELLING EXPERIENCES INCORPORATING INTERACTIVE PHYSICAL COMPONENTS

This application claims the benefit of priority of U.S. provisional application Ser. No. 63/005,710, filed on Apr. 6, 2020 the disclosure of which is herein incorporated by reference in its entirety.

GOVERNMENT LICENSE RIGHTS

This invention was made with government support under contract numbers DUE 1839971, OIA 1937036, and IIP 1632154 awarded by the National Science Foundation. The government has certain rights in the invention.

FIELD

The device and method disclosed in this document relates to augmented reality and, more particularly, to authoring augmented reality storytelling experiences incorporating interactive physical devices.

BACKGROUND

Unless otherwise indicated herein, the materials described in this section are not prior art to the claims in this application and are not admitted to the prior art by inclusion in this section.

Storytelling is often thought of as the process of creating and/or engaging in narrative structures. Today, storytelling is a tool used in a myriad of applications such as Education, Engineering, and Design. In fact, storytelling can be a powerful tool for building skills in communication, collaboration, creativity, and retention. Researchers have established a connection between storytelling and are making an attempt to help expose people to technology in new and exciting ways.

There are several different storytelling platforms that are intertwined with current trends in technology, including educational platforms like FaTe2, interactive platforms like StoryRooms and StoryMat, tangible platforms like StoryBox, collaborative platforms like TinkRBook, and highly creative robotics kits like Goldiblox and Handimate. Additionally, the mainstreaming of augmented reality has ushered a brand-new generation of mobile user interfaces that transform our mobile devices into a gateway between the physical and virtual worlds. Existing technology has focused on using augmented reality to bring virtual content into the real world in order to create exciting and unique experiences for young users; however, there have been few advances in technology that transcend this idea by giving these users the power to augment and control physical objects that users create, with the virtual content.

SUMMARY

A method for providing an augmented reality storytelling experience is disclosed. The method comprises wirelessly pairing a transceiver of an augmented reality device with a first controller, the first controller being incorporated with a first physical device in a real-world environment and configured to control a first electronic actuator of the first physical device to perform a first operation of the first physical device. The method further comprises displaying, on a display screen of the augmented reality device, a first graphical user interface including a first virtual object superimposed on images of the real-world environment. The method further comprises updating, based on user inputs received via a user interface of the augmented reality device, the first graphical user interface to move the first virtual object around the real-world environment. The method further comprises transmitting, with the transceiver, a first command to the first controller in response to a first predetermined movement of the first virtual object in the real-world environment, the first command being configured to cause the first controller to control the first electronic actuator to perform the first operation of the first physical device.

An additional method for providing an augmented reality storytelling experience is disclosed. The method comprises wirelessly pairing a transceiver of an augmented reality device with a first controller, the first controller being incorporated with a first physical device in a real-world environment and configured to control a first electronic actuator of the first physical device to perform a first operation of the first physical device. The method further comprises displaying, on a display screen of the augmented reality device, a first graphical user interface including a first virtual object superimposed on images of the real-world environment. The method further comprises receiving, with the transceiver of the augmented reality device, a first command from the first controller. The method further comprises updating, in response to receiving the first command, the first graphical user interface to animate the first virtual object to perform a first action.

BRIEF DESCRIPTION OF THE DRAWINGS

The foregoing aspects and other features of the storytelling system are explained in the following description, taken in connection with the accompanying drawings.

DETAILED DESCRIPTION

Figure 1:
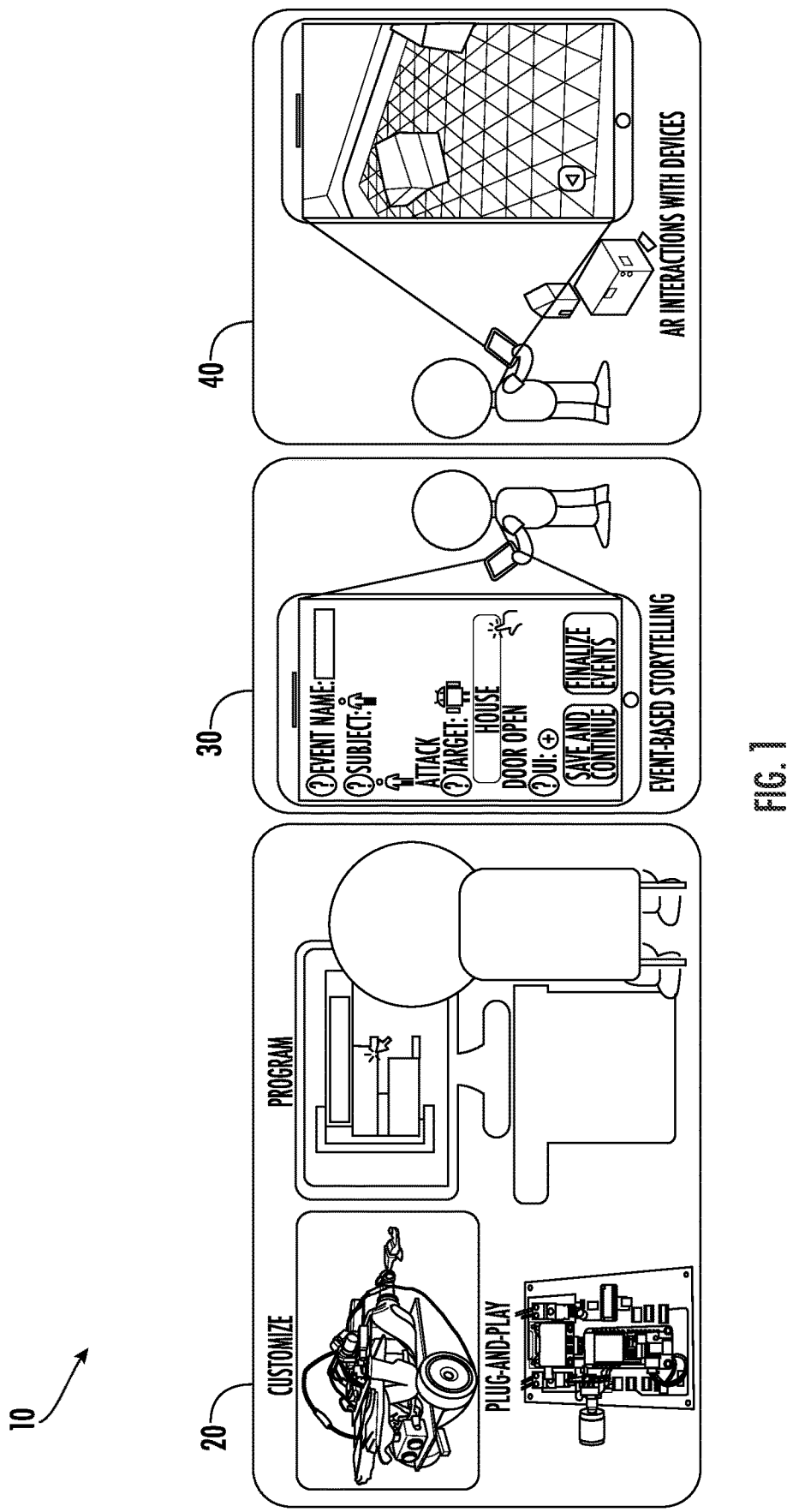
FIG. 1 shows a workflow for providing storytelling experiences using a storytelling system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

System Overview

A unique storytelling system is disclosed herein in which a plug-and-play hardware platform with an integrated augmented reality (AR) environment brings stories to life. The storytelling system includes an electronics toolkit and a structure toolkit which enable the user to prototype interactive physical devices for storytelling. The interactive physical devices crafted by the user are easily programmed using a simple visual programing environment of the storytelling system. Additionally, a story event planning tool of the storytelling system enables the user to create customized interactions between the interactive physical devices and virtual AR objects, such as virtual AR avatars or the like. Finally, an AR storytelling application of the storytelling system utilizes an AR device, such as a smartphone, to bring the interactive physical devices to life and enable the user to tell stories using the custom interactions that he or she created.

With reference to FIG. 1, the workflow of the storytelling system is described. In a first phase 20, the user crafts and designs one or more interactive physical devices to be used in the storytelling experience. Particularly, the user builds interactive physical devices in the form of electro-mechanical devices using an electronics toolkit and a structure toolkit. The electronics toolkit includes a plug-and-play control board and a plurality of modular electronic components that can be controlled by the control board. The structure toolkit includes a set of materials that, in conjunction with the electronics toolkit can be used to construct and customize the interactive physical devices for the story. Once the interactive physical devices are physically constructed, the user programs the control board to control the interactive physical devices using the drag-and-drop visual programing environment. In a second phase 30, the user defines one or more interaction events between interactive physical devices and/or virtual AR objects to be used in the storytelling experience using the story event planning tool. Particularly, the user defines interactions in which an action or movement of one of the interactive physical devices and/or virtual AR objects causes another of the interactive physical devices and/or virtual AR objects to respond with another action. Finally, in a third phase 40, using an AR storytelling application of on an AR device, users control the interactive physical devices and the virtual AR objects to act out stories, which include the one or more interaction events defined by the user.

The storytelling system described herein is advantageous in many ways. Firstly, the storytelling system is accessible, due to low cost components. Particularly, previous design toolkits typically use high fidelity materials and are costly, whereas the storytelling system described herein puts an emphasis on mixing input and output (I/O) devices with low fidelity (lo-fi) materials to increase accessibility. Secondly, the storytelling system described herein improves engagement by engaging the user throughout the play cycle (Design—Build—Play) and encouraging the user to explore new configurations when they've finished with older versions. Thirdly, the storytelling system described herein enables self-expression by giving users control over their storytelling experience by creating their own interactive physical devices, or altering pre-made interactive physical devices. Finally, the storytelling system described herein is plug-and-play with minimal configuration, thereby making it accessible to children of various skillsets by eliminating the need for prior electronics and programing knowledge.

Electronics and Structure Toolkits

Figure 2:
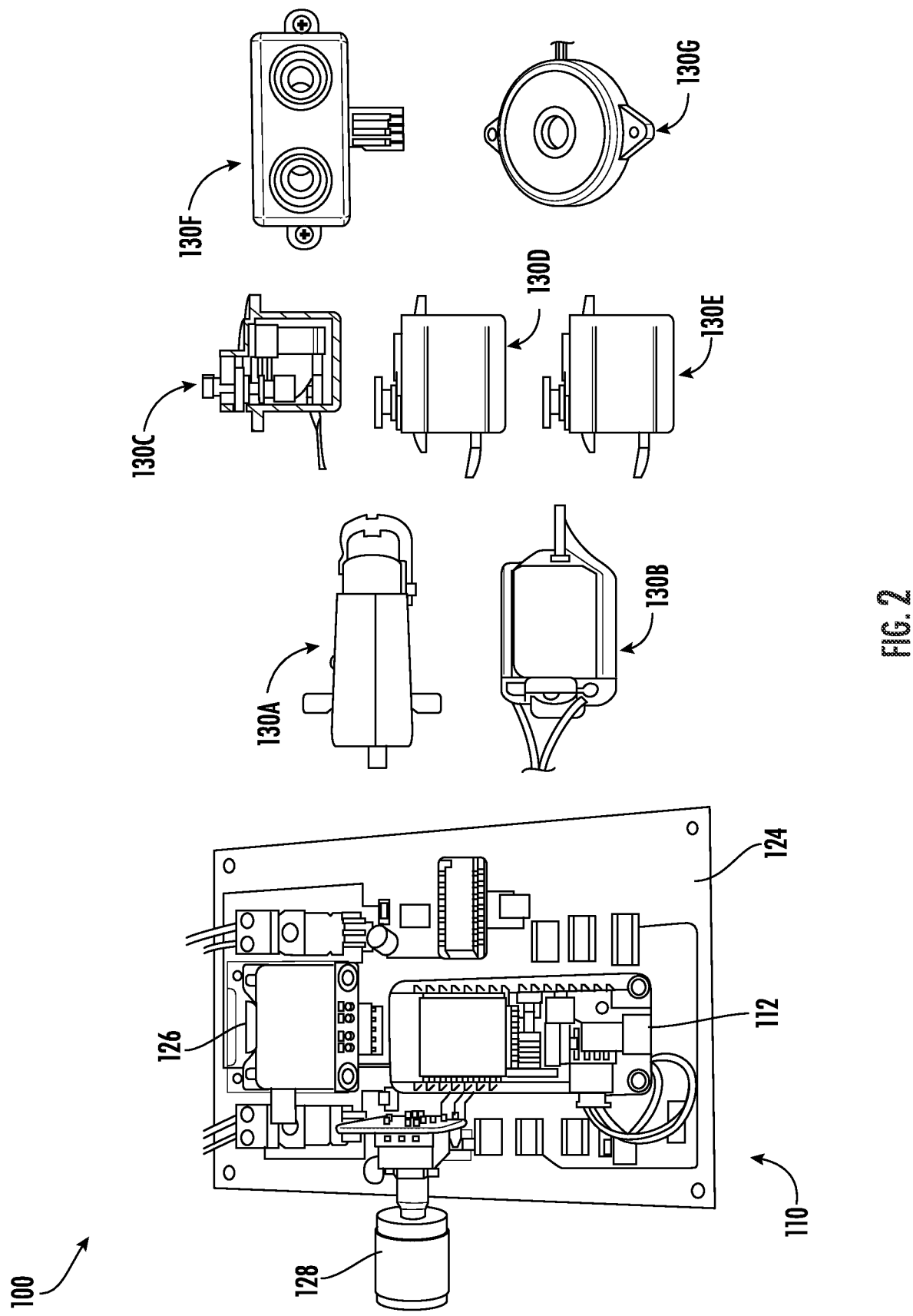
FIG. 2 shows an exemplary assortment of modular electronic components of an electronics toolkit of the storytelling system.
Figure 3:
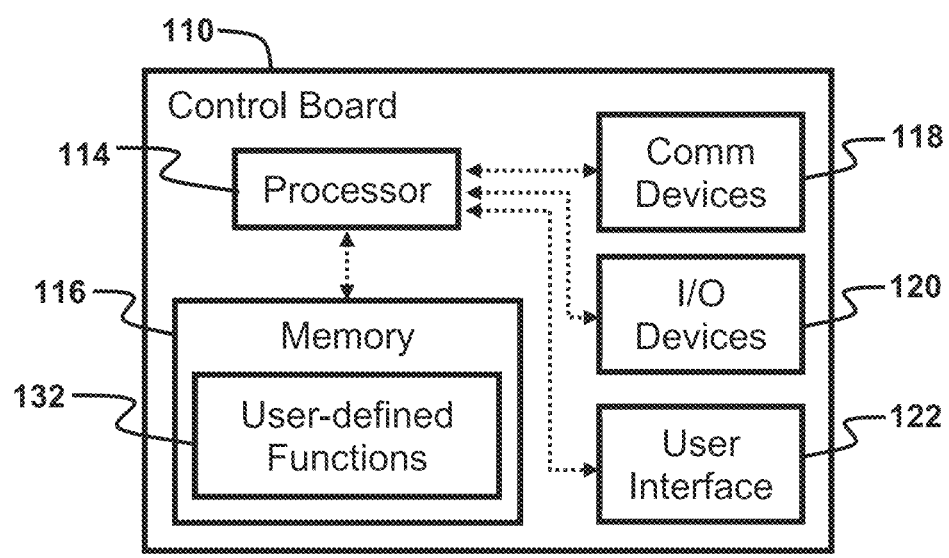
FIG. 3 shows exemplary components of a control board of the electronics toolkit.

As noted above, the storytelling system includes an electronics toolkit and a structure toolkit which enable the user to prototype interactive physical devices for storytelling. With reference to FIGS. 2-3, exemplary components of an electronics toolkit 100 are described. The electronics toolkit 100 includes a plug-and-play control board 110 and a plurality of modular electronic components 130A-G that can be controlled by the control board 110. The control board 110 includes a microcontroller 112, one or more communication devices 118, a plurality of I/O devices 120, a user interface 122, and a power supply (not shown), arranged on a PCB 124.

As shown in FIG. 3, the microcontroller 112 of the control board 110 may comprise at least one processor 114 and memory 116. The memory 116 is configured to store data and program instructions that, when executed by the processor 114, enable the control board 110 to perform various operations described herein, including user-defined functions 132 (discussed below). The memory 116 may be of any type of device capable of storing information accessible by the processor 114, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 114 may include a system with a central processing unit, graphics processing units, multiple processing units, dedicated circuitry for achieving functionality, programmable logic, or other processing systems.

The one or more communication devices 118 include transceivers, modems, or other communication devices configured to enable communications with various other devices, at least including an AR device for providing the AR storytelling experience. Particularly, in at least one embodiment, the control board 110 comprises a Wi-Fi module. The Wi-Fi module is configured to enable communication with a Wi-Fi network and/or Wi-Fi router (not shown) and includes at least one transceiver with a corresponding antenna, as well as any processors, memories, oscillators, or other hardware conventionally included in a Wi-Fi module. Additionally, in at least one embodiment, the control board 110 comprises a Bluetooth Low Energy (BLE) module. The BLE module is configured to enable direct communication with the AR device or other computing devices and includes at least one transceiver with a corresponding antenna, as well as any processors, memories, oscillators, or other hardware conventionally included in a BLE module. It will be appreciated, however, that other communication technologies, such as Z-Wave, Zigbee, or any other radio frequency-based communication technology can be used to enable data communications between the control board 110 and the AR device or other computing devices.

The plurality of I/O devices 120 includes I/O ports 1-8 (FIG. 2) and other I/O components of the control board 110 that are configured to enable the microcontroller 112 to operably connect with and control or receive information from a select set of modular electronic components provided in the electronics toolkit. In the exemplary embodiment of FIG. 2, the control board 110 gives the user access to 8 distinct I/O ports which connect to the modular electronic components. In one embodiment, ports 1-5 are reserved for modular electronic components that receive output commands, while ports 6-8 are reserved for modular electronic components that provide input information. Modular electronic components with two, three, and four pins can be used with the illustrated exemplary control board 110.

With reference to FIG. 2, an exemplary assortment of modular electronic components 130A-G are shown. Particularly, the electronics toolkit 100 includes a variety of electric motors, sensors, input devices, and output devices. The exemplary assortment of modular electronic components includes a DC motor 130A having a speed reducing gearbox (e.g., 1:48 gear ratio). The exemplary assortment of modular electronic components includes a DC motor 130B without a speed reducing gearbox. The exemplary assortment of modular electronic components includes a small servo motor 130C capable of rotating between 0° and 180°. The exemplary assortment of modular electronic components includes a high torque, large servo motor 130D capable of rotating between 0° and 180°. The exemplary assortment of modular electronic components includes a high torque, large continuous servo motor 130E capable of continuous rotation. The exemplary assortment of modular electronic components includes an ultrasonic sensor 130F that uses high frequency sound waves to detect objects at a distance. The exemplary assortment of modular electronic components includes a small piezo sound buzzer 130G that can output an audible buzz with a wide range of frequencies.

It should be appreciated that the modular electronic components 130A-G are merely exemplary and that the electronics toolkit 100 may any assortment of modular electronic components including motors, speakers or other audio output devices, LEDs or other lights, solenoids, switches, line followers, color sensors, pressure sensors, other sensors, buttons, and the like. These modular electronic components are to be used with materials provided in the structure toolkit to construct interactive physical devices for storytelling. The modular electronic components can be easily connected to the control board 110 via the I/O ports 1-8 without requiring the users to undergo a significant amount of training.

Once the modular electronic components 130A-G are connected to the control board 110 (e.g., via the ports 1-8) and once the control board 110 is connected to WiFi, users can assign the control board 110 a device type and/or device name and select the occupied pins using the user interface 122. Particularly, in the illustrated embodiment of FIG. 2, the control board 110 has a small screen 126, such as an LCD screen, and knob/button 128 which provides a simple user interface for assigning the connected modular electronic components to the correct I/O ports.

In conjunction with the electronics toolkit 100, the structure toolkit can be used to construct and customize the interactive physical devices for the story. Particularly, the modular electronic components of the electronics toolkit 100 can be integrated with structural materials provided in the structure toolkit, or with any other materials that are accessible to the user. The structure toolkit (not shown) includes a set of materials, such as recyclable materials, 3D printed parts, connectors, fabric, paint, and many other items that they can use to customize their interactive physical devices. In some embodiments, the structure toolkit includes one or more pre-made physical structures that can be used in the user's story. In an exemplary embodiment, the structure toolkit consists of (1) a pre-made house, intended to respond to a virtual AR avatar walking up to it by moving a small servo to open the door, (2) a pre-made car to work standalone where the user can drive the car for their story or work alongside (3) a pre-made garage to open the garage door, with which the user can move a physical device into the range of the ultrasonic sensor and a motor rotates the garage door open. The design of these exemplary pre-made devices may be chosen as a starting point for the structure toolkit because of their relation with each other.

As will be described below in greater detail, the control board 110 can be easily programmed by the user using a visual programing environment to create one or more user-defined functions, operations, and/or actions 136 that can be performed by the interactive physical devices.

Augmented Reality and Other Computing Devices of the Storytelling System

As noted above, the storytelling system includes as least one AR device capable of providing an AR storytelling experience for a user. Additionally, the storytelling system may include one or more additional computing devices that enable a user to author the AR storytelling experience using various programing interfaces and tools.

Figure 4:
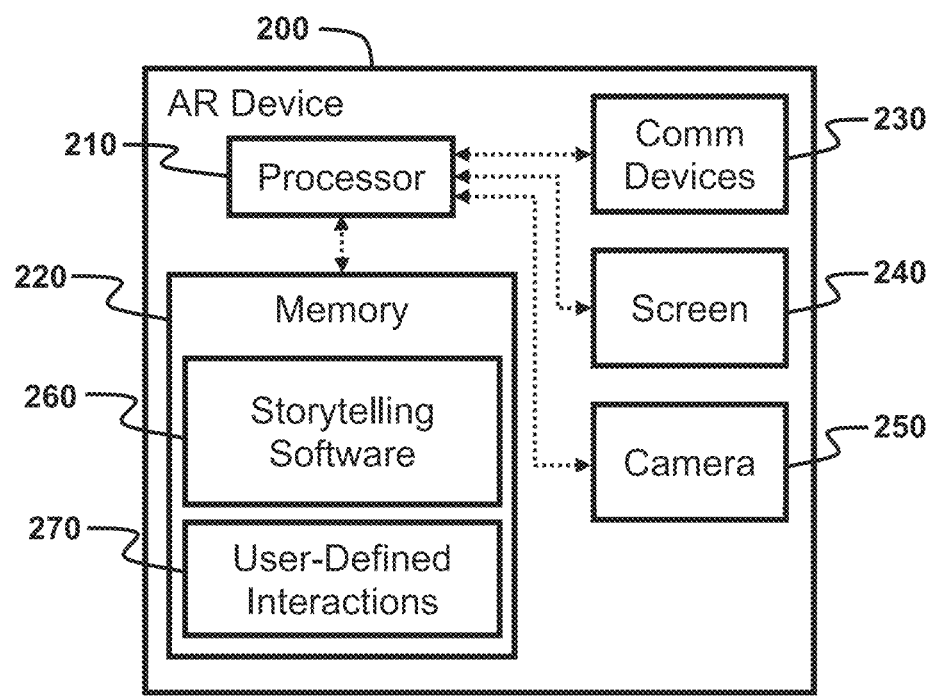
FIG. 4 shows exemplary components of an augmented reality device of the storytelling system.

FIG. 4 shows exemplary components of an AR device 200 for providing storytelling experiences in conjunction with interactive physical devices crafted using the electronics toolkit 100 and the structure toolkit. The AR device 200 is, for example, in the form of a smart phone or head mounted display. The AR device 200 includes, for example, a processor 210, a memory 220, one or more communication devices 230, a display screen 240, and a camera 250. The memory 220 is configured to store data and program instructions that, when executed by the processor 210, enable the AR device 200 to perform various operations described herein. The memory may be of any type of device capable of storing information accessible by the processor 210, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 210 may include a system with a central processing unit, graphics processing units, multiple processing units, dedicated circuitry for achieving functionality, programmable logic, or other processing systems.

The communication devices 230 comprise one or more transceivers, modems, or other communication devices configured to enable communications with various other devices, at least including the control board 110 for providing the AR story experience. Particularly, in at least one embodiment, the AR device 200 comprises a Wi-Fi module. The Wi-Fi module is configured to enable communication with the control board 110 via a Wi-Fi network and/or Wi-Fi router (not shown) and includes at least one transceiver with a corresponding antenna, as well as any processors, memories, oscillators, or other hardware conventionally included in a Wi-Fi module. Additionally, in at least one embodiment, the AR device 200 comprises a Bluetooth Low Energy (BLE) module. The BLE module may be configured to enable direct communication with the control board 110 and includes at least one transceiver with a corresponding antenna, as well as any processors, memories, oscillators, or other hardware conventionally included in a BLE module. It will be appreciated, however, that other communication technologies, such as Z-Wave, Zigbee, or any other radio frequency-based communication technology can be used to enable data communications between the AR device 200 and the control board 110.

The camera 250 of the AR device 200 is configured to capture a plurality of images of the environment as the AR device 200 is moved through the environment by the user. The camera 250 is configured to generate image frames of the environment, each of which comprises a two-dimensional array of pixels. Each pixel has corresponding photometric information (intensity, color, and/or brightness). In some embodiments, the camera 250 is configured to generate RGB-D images in which each pixel has corresponding photometric information and geometric information (depth and/or distance). In such embodiments, the camera 250 may, for example, take the form of two RGB cameras configured to capture stereoscopic images, from which depth and/or distance information can be derived, or an RGB camera with an associated IR camera configured to provide depth and/or distance information.

The display screen 240 of the AR device 200 may comprise any of various known types of displays, such as LCD or OLED screens. In the case of a head mounted display, the display screen 240 is a transparent screen, through which a user can view the outside world, on which certain graphical elements are superimposed onto the user's view of the outside world. In the case of smart phone, the display screen 240 is non-transparent and the graphical elements may be superimposed on real-time images/video captured by the camera 250. In further embodiments, the display screen 240 may comprise a touch screen configured to receive touch inputs from a user. In some embodiments, the AR device 200 includes additional user interfaces such as a mouse or other pointing device, a keyboard or other keypad, speakers, and a microphone.

The AR device 200 may also include a battery or other power source configured to power the various components thereof. In one embodiment, the battery of the AR device 200 is a rechargeable battery configured to be charged when the AR device 200 is connected to a battery charger configured for use with the AR device 200.

The AR device 200 is at least used to provide an AR storytelling experience. To this end, the memory 220 stores storytelling software 260 that enables the user to act out stories by controlling the interactive physical devices constructed using the electronics toolkit 100 and structure toolkit, as well as control one or more virtual AR objects. Additionally, the storytelling software 260 enables the user to define a variety of interactions 270 between the interactive physical devices and/or the virtual AR objects, that augment the user's storytelling experience. Finally, in some embodiments, the storytelling software 260 includes the visual programing environment for programming and configuring the interactive physical devices constructed using the electronics toolkit 100 and structure toolkit As noted above, the storytelling system may also comprise other computing devices, such as personal computer or laptop, which are used during the device programing and story event creation process. Particularly, rather than using the AR device 200, in some embodiments, the user using another computing device for programing and configuring the interactive physical devices constructed using the electronics toolkit 100 and structure toolkit, or for defining the interactions 270 between the interactive physical devices and/or the virtual AR objects. Such other computing devices will generally have similar components to those described above with respect to the AR device 200, and are not described in detail herein.

Methods and Software for Operating the Storytelling System

The storytelling system utilizes three different software components, each for a different step in the workflow of the storytelling system. First, the storytelling system provides a drag-and-drop visual programing environment that enables users to program the control board(s) 110 to control the interactive physical devices constructed using the electronic toolkit 100 and structure toolkit. The visual programing environment advantageously gives the user a quick and simple way to program their devices without the need to learn the details of the particular programing language the microcontroller on the control board 110. The visual programing environment for programming the control board(s) 110 can be provided on the AR device 200 or on another computing device, such as personal computer or laptop.

Second, the storytelling system provides a story event planning tool that enables the user to design interaction events between their virtual AR objects and interactive physical devices. The story event planning tool advantageously gives users control over the story flow, and the design of their interactions. The story event planning tool for defining interaction events can be provided on the AR device 200 or on another computing device, such as personal computer or laptop.

Third, the storytelling system includes is an AR storytelling application for the AR device 200 that wirelessly pairs to the control board 110(s) and turns the interactive physical devices that the user constructed into Internet of Things (IoT) devices that can be controlled by the AR device 200 for the purpose of providing an AR storytelling experience. To this end, the AR storytelling application provides a variety of AR graphical user interfaces for controlling the interactive physical devices and virtual AR objects, such as virtual AR avatars or the like, within the environment.

A variety of methods, workflows, and processes are described below for enabling the operations and interactions of the storytelling system. In these descriptions, statements that a method, workflow, processor, and/or system is performing some task or function refers to a controller or processor (e.g., the microcontroller 112 and/or processor 114 of the control board 110, the processor 210 of the AR device 200, or a processor of another computing device) executing programmed instructions (e.g., the user-defined functions 132, the user-defined interactions 270, or the storytelling software 260 which includes one or more of the AR storytelling application, story event planning tool, and the visual programing environment) stored in non-transitory computer readable storage media (e.g., the memory 116 of the control board 110, the memory 220 of the AR device 200, or memory of another computing device) operatively connected to the controller or processor to manipulate data or to operate one or more components in the storytelling system to perform the task or function. Additionally, the steps of the methods may be performed in any feasible chronological order, regardless of the order shown in the figures or the order in which the steps are described.

Various user interfaces are utilized by the AR device 200 and/or another computing device for programming the control board(s) 110 of the interactive physical devices, defining interaction events between the virtual AR objects and/or interactive physical devices, and otherwise operating the storytelling system. In general, these user interfaces are provided by operating a display, such as the display screen 240 of the AR device 20, to display a graphical user interface. The graphical user interface may include a variety of virtual buttons or other interactable elements. The user may interact with the virtual buttons or other interactable elements in the graphical user interface by providing user inputs via a user interface, such by as moving and clicking with a mouse, by typing with a keyboard, or by directly touching the display screen 240 in the case that the display screen 240 is a touch screen.

Additionally, various AR graphical user interfaces are utilized by the AR device 200 for operating the storytelling system. In many cases, the AR graphical user interfaces include graphical elements (e.g., the virtual AR avatars or other virtual AR objects) that are superimposed onto the user's view of the outside world or, in the case of a non-transparent display screen 240, superimposed on real-time images/video captured by the camera 250. In order to provide these AR graphical user interfaces, the processor 210 executes instructions of an AR graphics engine to render these graphical elements and operates the display 240 to superimpose the graphical elements onto the user's view of the outside world or onto the real-time images/video of the outside world. In many cases, the graphical elements are rendered at a position that depends upon positional or orientation information received from any suitable combination of the camera 250, external sensors in the environment, and other sensors of the AR device 200 so as to simulate the presence of the graphical elements in real-world the environment. The various AR graphical user interfaces also include one or more virtual buttons or equivalent user interfaces that enable the user to provide user inputs, in particular for controlling the interactive physical devices and the virtual AR avatars or other virtual AR objects.

Finally, various forms of motion tracking are utilized in which spatial positions and motions of the user, or of other objects in the environment are tracked. In order to provide this tracking of spatial positions and motions, the processor 210 executes instructions of the storytelling software 270 to receive and process sensor data from any suitable combination of the camera 250, external sensors in the environment, and other sensors of the AR device 200, and may optionally utilize visual and/or visual-inertial odometry methods such as simultaneous localization and mapping (SLAM) techniques.

Figure 5:
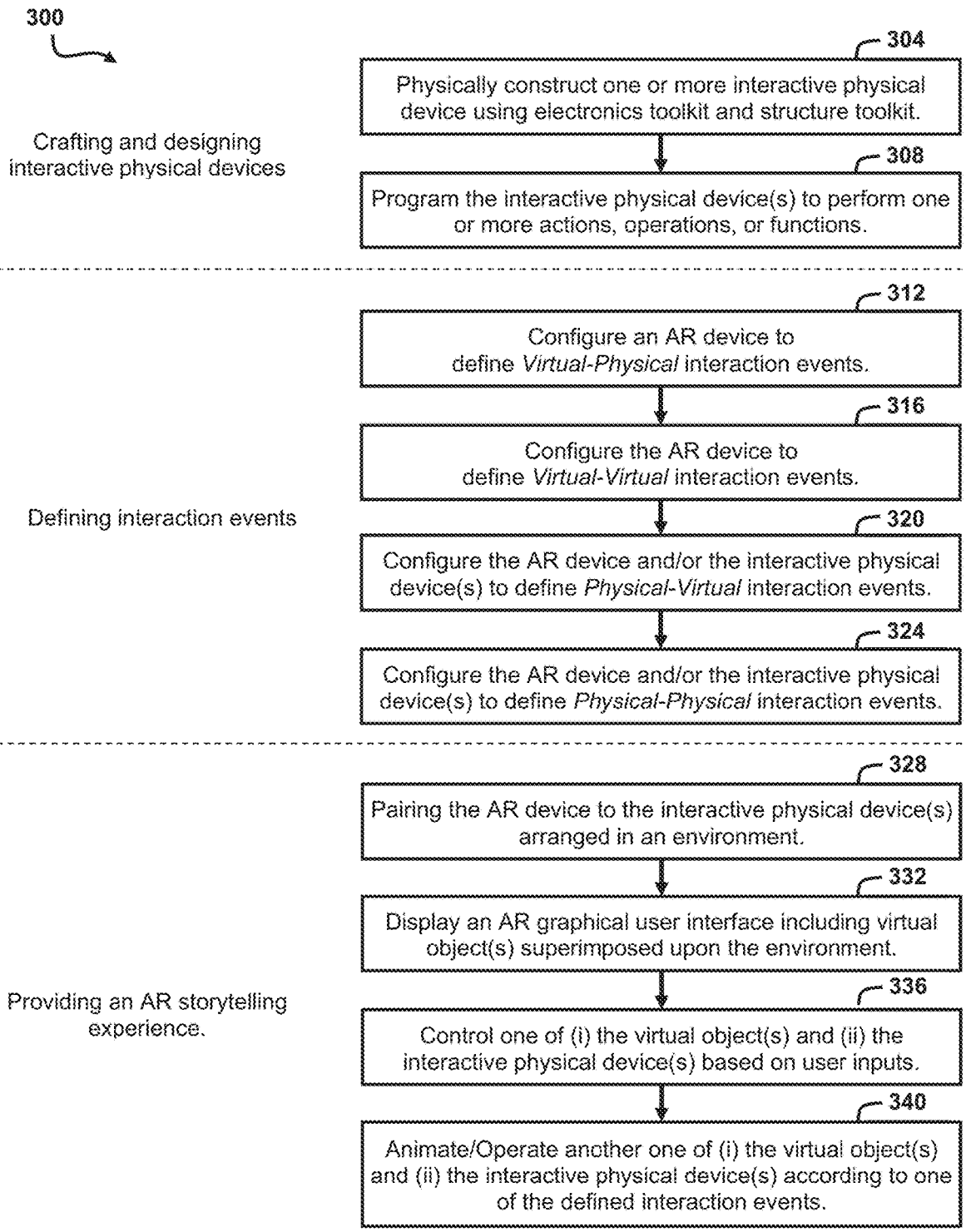
FIG. 5 shows a flow diagram for a method for operating the storytelling system to provide a storytelling experience.

FIG. 5 shows a flow diagram for a method 300 for operating the storytelling system to provide a storytelling experience. The method 300 enables the interactive physical devices crafted by the user to be easily programmed using the simple visual programing environment of the storytelling system. Additionally, the method 300 enables the user to create customized interactions between the interactive physical device(s) and the virtual AR avatar(s) or other virtual AR objects(s). Finally, the method 300 utilizes the AR device 200 to bring the interactive physical devices to life and to tell stories using the custom interactions created by user.

The method 300 begins with physically constructing one or more interactive physical device using electronics toolkit and structure toolkit (block 304). Particularly, as described above, the electronics toolkit 100 and structure toolkit include a variety of electronic components and materials for designing and physically constructing interactive physical devices. For example, the user can integrate the plurality of modular electronic components 130A-G with the materials provided in the structure toolkit to create one or more interactive physical devices. Once the interactive physical device(s) are constructed, the modular electronic components 130A-G that are incorporated therewith are connected to the I/O ports 1-8 of the control boards 110. In one embodiment, the user operates the user interface 122 of the control boards 110, in particular the small screen 126 and knob/button 128, to define for the control board 110 which modular electronic component 130A-G is connected to each respective I/O port 1-8.

Figure 6:
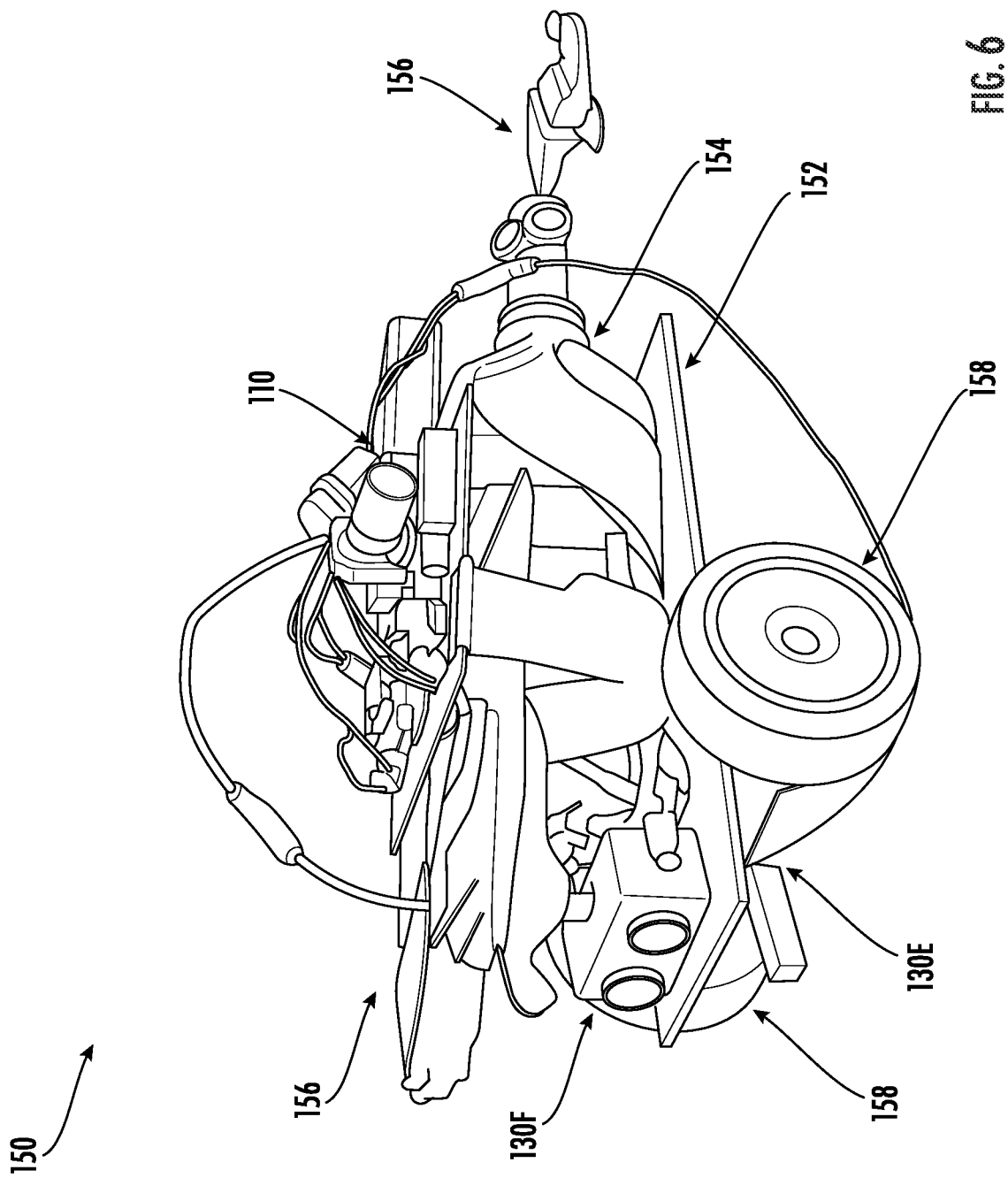
FIG. 6 shows an exemplary interactive physical device constructed by a user.

FIG. 6 shows an exemplary interactive physical device constructed by a user in the form of a vehicle 150. The vehicle 150 is crafted using materials including a piece of cardboard 152, an empty water bottle 154, and decorative feathers 156. The vehicle 150 incorporates a set of wheels 158 that are rotated by the large continuous servo motor 130E, which attaches the wheels 158 to the bottom of the cardboard 152. Additionally, the vehicle 150 incorporates the ultrasonic sensor 130F at a front of the vehicle 150 on top of the cardboard 152.

Returning to FIG. 5, the method 300 continues with programing the interactive physical device(s) to perform one or more actions, operations, or functions (block 308). Particularly, a visual programing environment is executed on the augmented reality device 200 or on another computing device, such as personal computer or laptop. The user provides inputs (e.g., typing, clicking, etc.) via the visual programing environment, based on which program instructions are generated for the control board 110 to control the integrated modular electronic component 130A-G to perform one or more user-defined actions, operations, or functions. The generated program instructions are downloaded to the control board 110.

Figure 7:
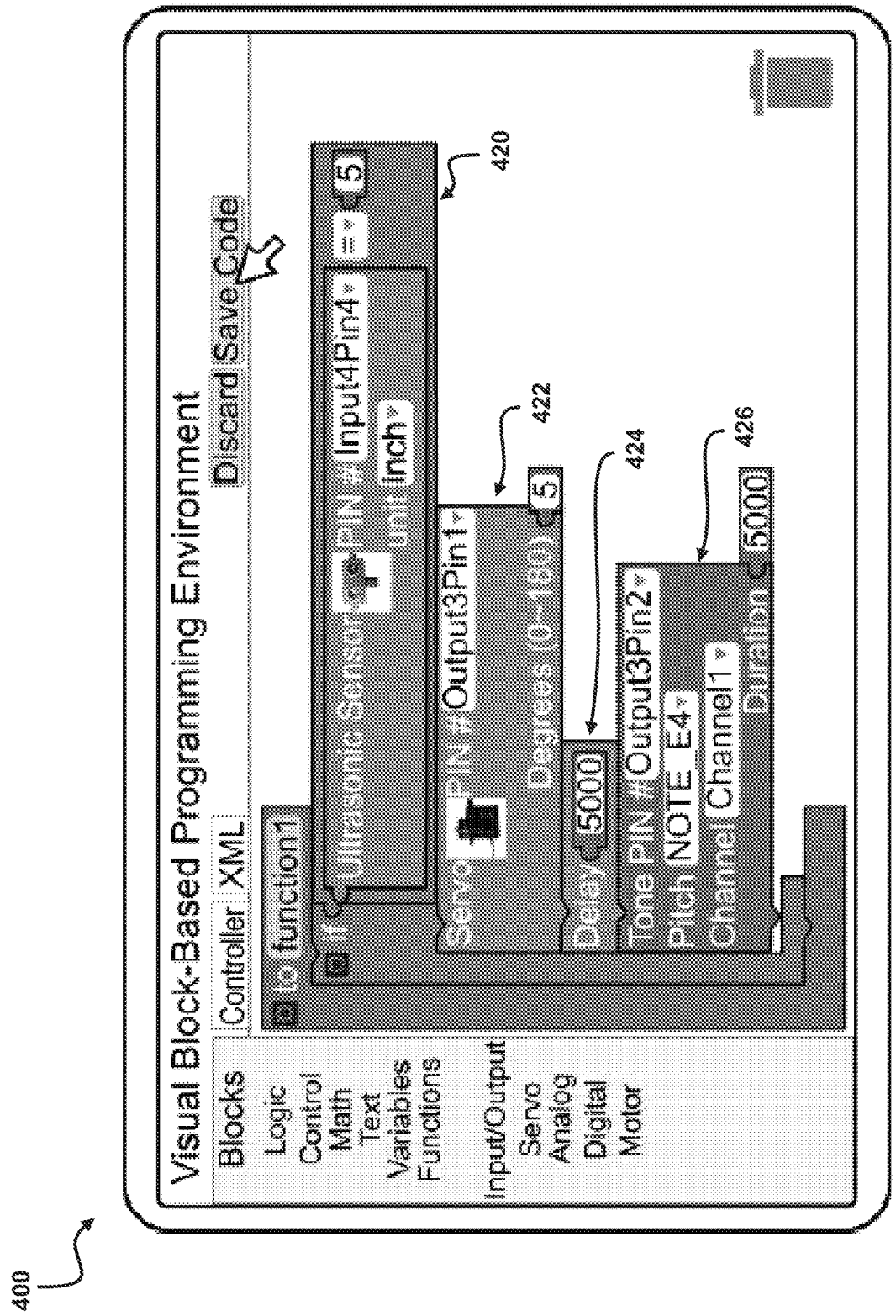
FIG. 7 shows a graphical user interface of a visual programing environment for programming the interactive physical device(s) constructed by the user.

FIG. 7 shows a graphical user interface 400 of the visual programing environment. Particularly, after a user builds his or her interactive physical device(s), the visual programing environment enables the user to program the control board 110 to control their interactive physical device(s) using one or more user-defined actions, operations, or functions. The visual programing environment is a graphical user interface, which runs on the AR device 200 or another computing device, that allows the user to plug code blocks, operators, control parameters, and values in various combinations to create program instructions/code and outputs syntactically correct instructions/code in for the microcontroller of the control board 110 (e.g., in the Arduino programing language). In one embodiment, visual programing environment is built from the open-source web app BlocklyDuino. However, the visual programing environment builds on top of BlocklyDuino and extends it to libraries, such as the ESP32 libraries, which are used for the modular electronic components 130A-G of the electronics toolkit 100. Users can create their own user-defined actions, operations, or functions based on the modular electrical components 130A-G they select from the electronics toolkit 100. In one embodiment, the visual programing environment makes use of common controller commands such as DigitalWrite( ) and DigitalRead( ) while allowing users to choose from a list of built-in commands that are specific to the particular the modular electrical components 130A-G included in the electronics toolkit 100. Each interactive physical device is programmed individually in the visual programing environment and may each be programmed with one or more user-defined actions, operations, or functions.

Based on the user inputs to the visual programing environment, the processor of the AR device 200 or other computing device generates and compiles suitable program instructions/code for the control board 110 (e.g., Arduino code). The AR device 200 or other computing device transmits the compiled program code to the control board 110 via an Over-The-Air (OTA) server or other wireless/ wired connection. The control board 110 receives the compiled program instructions/code via one of the communication devices 118 and stores the generated program instructions/code in the memory 116 (e.g., in the form of the user-defined functions 132). The name of each interactive physical device and the names of the user-defined actions, operations, or functions that have been programmed for each interactive physical device are be downloaded to the AR device 200 from each control board 110 (e.g., in the form of a text file).

Returning to FIG. 5, the method 300 continues with configuring a plurality of interaction events that will be used during the storytelling experience (blocks 312, 316, 320, 324). Particularly, the user provides inputs to the AR device 200 or another computer device to define a plurality of interaction events in which a virtual AR object and/or interactive physical device is controlled by the user and some kind of automated response animation or operation is triggered for another virtual AR object and/or interactive physical device.

In the illustrated embodiments, the user defines interaction events between the user-constructed interactive physical device and virtual AR avatars, i.e., virtual representations of a character, persona, animal, or other living creature. However, it should be appreciated that the virtual AR avatars described herein are merely illustrative examples of virtual objects that can be incorporated into the storytelling experience by defining interaction events. As another example, interaction events can also be defined that incorporate virtual representations of other objects such as (1) a virtual object representing a bomb that can be virtually moved around the environment by the user and "detonated" to initiate a physical response from the interactive physical device or (2) a virtual object representing a projectile (e.g., a dart, arrow, missile, etc.) that can be virtually launched across the environment by the user to "collide" with the interactive physical device and initiate a corresponding physical response from the interactive physical device.

Figure 8:
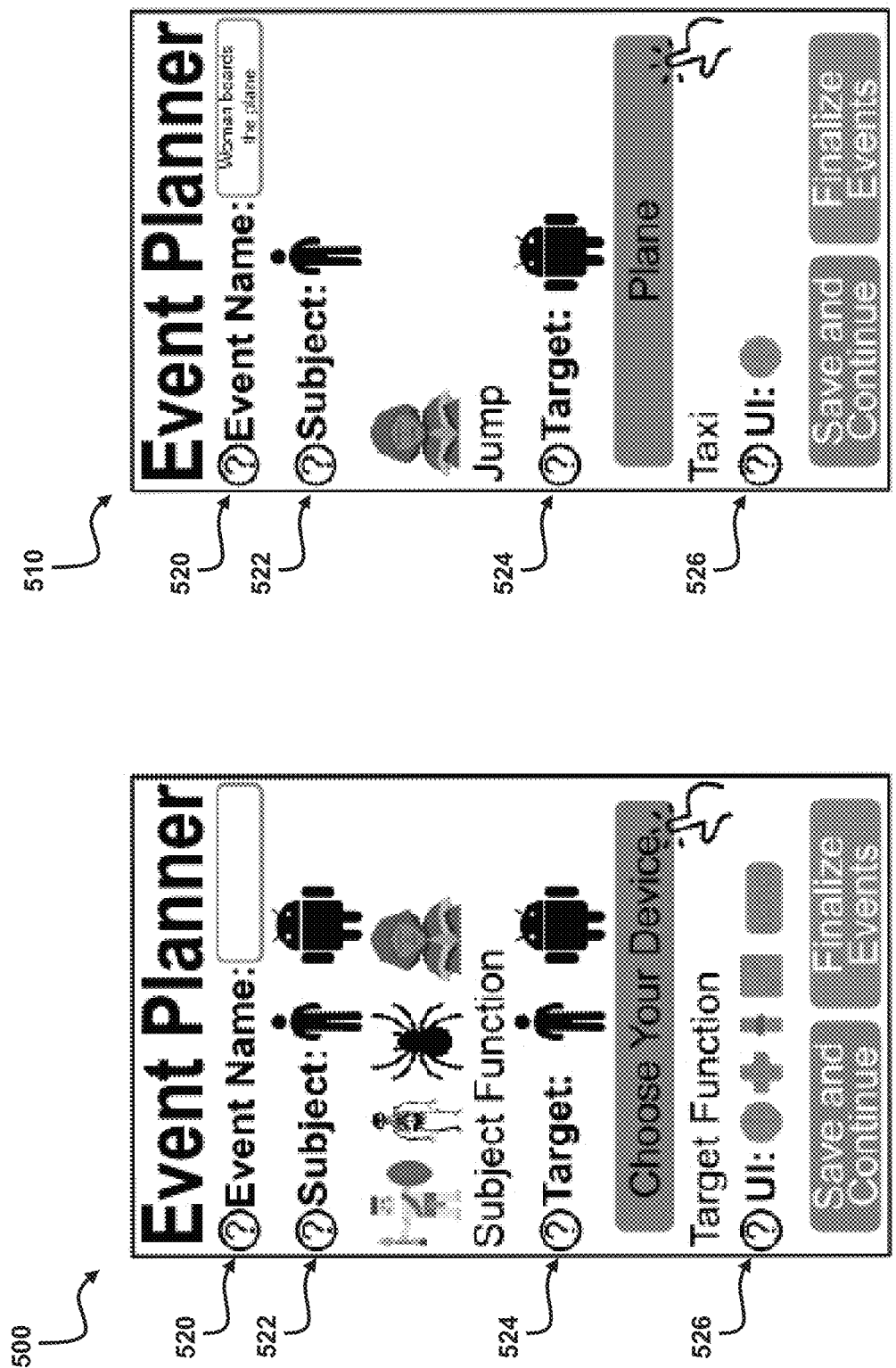
FIG. 8 shows graphical user interfaces of a story event planning tool for designing interaction events between virtual and physical content.

FIG. 8 shows graphical user interfaces 500, 510 of a story event planning tool. Particularly, once the user has programmed the control board 110 to operate the interactive physical devices with the desired user-defined actions, operations, or functions, the story event planning tool enables the user to create one or more events that form the story that they would like to tell. The story event planning tool is a graphical user interface, which runs on the AR device 200 or another computing device, that enables the user to configure and design interaction events that happen between virtual AR avatar(s) and interactive physical device(s).

Each interaction event that is created using the story event planning tool has four defining components that can be selected via the graphical user interfaces 500, 510 of the story event planning tool: an Event Name 520, a Subject 522, a Target 524, and a User Interface 526. First, the Event Name 520 is short text description of what happens during the interaction event. Next, the Subject 522 is the virtual AR avatar or interactive physical device that the user controls during the interaction event. In the illustrated embodiment, users can choose between any of four different virtual AR avatars (e.g., from left to right: a warrior man, a skeleton, a spider, and a magic woman), or from a list of interactive physical devices that were constructed. If a virtual AR avatar is chosen as the Subject 522, users can select an animation ("Subject Function") for the character to perform during the interaction event. If an interactive physical device is chosen as the Subject 522, users can select one of the previously programed user-defined actions, operations, or functions ("Subject Function") of the interactive physical device that triggers the interaction event or for the interactive physical device to perform during the interaction event.

Next, the Target 524 is the virtual AR avatar or interactive physical device that performs an action when the Subject 522 interacts with it. Users can choose between the virtual AR avatars or interactive physical devices for these interactions. If a virtual AR avatar is chosen as the Target 524, users can select an animation ("Target Function") for the character to perform in response to being interacted with by the Subject 522. If an interactive physical device is chosen as the Target 524, users can select one of the user-defined actions, operations, or functions ("Target Function") for the interactive physical device to perform in response to being interacted with by the Subject 522.

Finally, the User Interface 526 gives the user control over the Subject 522 during that interaction event. In the illustrated embodiment, users can choose between any of our four virtual user interfaces (e.g., from left to right: a virtual joystick, a virtual direction pad, a virtual slider, a virtual toggle button, and an action button). The user may select the virtual joystick, for example, to control all virtual AR avatars. The user may select the virtual direction pad, for example, to control interactive physical devices having wheels, such as the vehicle 150. The user may select the virtual slider, for example, to control interactive physical devices having servo motors. The user may select the virtual toggle button, for example, to toggle between two different user-defined actions, operations, or functions of interactive physical devices. The user may select an action button, for example, to initiate one of the user-defined actions, operations, or functions of the interactive physical devices.

As described in greater detail below, these interaction events are classified into different types of interaction events: Virtual-Physical interaction events, Virtual-Virtual interaction events, Physical-Virtual interaction events, and Physical-Physical interaction events.

Particularly, returning to FIG. 5, the method 300 continues with configuring an AR device to define Virtual-Physical interaction events (block 312). Particularly, as used herein, Virtual-Physical interaction events are interactions in which virtual content, such as one of the virtual AR avatar(s), interacts with and controls a physical device, such as one of the interactive physical device(s). To define Virtual-Physical interaction events using story event planning tool, the user selects a virtual AR avatar as the Subject 522 and selects one of the interactive physical devices as the Target 524. Next, the user selects an animation ("Subject Function") for the virtual AR avatar to perform during the interaction event. Next, the user selects one of the user-defined actions, operations, or functions ("Target Function") for the interactive physical device to perform in response to being interacted with by the Subject 522 (i.e., the selected virtual AR avatar). Finally, the user selects the virtual joystick the User Interface 526 for controlling the Subject 522 (i.e., the selected virtual AR avatar). The parameters of the Virtual-Physical interaction events may be saved to the memory 220 of the AR device 200 (e.g., in the form of a text file).

With reference again to the graphical user interface 510 of FIG. 8, the user has created an exemplary Virtual-Physical interaction event named "Woman boards the plane" in which the user controls the magic woman using the virtual joystick. When the magic woman interacts with the "plane" interactive physical device, the magic woman performs a "jump" animation and the "plane" interactive physical device performs the user-defined "taxi" function (e.g., making an engine noise and operating wheels to move the plane).

As another example, the user might create a Virtual-Physical interaction event named "Dart thrown on a home" (not shown) in which the user controls a virtual AR dart or similar projectile. When the virtual AR dart is moved or "launched" by the user and is caused to interact with (i.e., collide with) a "house" interactive physical device, the virtual AR dart performs a "break the house" animation and the "house" interactive physical device performs the user-defined "break" operation (e.g., electronic actuators break the house by moving all the parts of the house apart). In this way, it should be understood that, in principle, any other type of virtual object can be similarly controlled by the user to trigger a physical response from the user-constructed interactive physical device.

Returning to FIG. 5, the method 300 continues with configuring the AR device to define Virtual-Virtual interaction events (block 316). Particularly, as used herein, Virtual-Virtual interaction events are interactions in which virtual content, such as one of the virtual AR avatar(s), interacts with and triggers an action of other virtual content, such as another one of virtual AR avatar(s). To create Virtual-Virtual interaction events using story event planning tool, the user selects a first virtual AR avatar as the Subject 522 and selects a second virtual AR avatar as the Target 524. Next, the user selects an animation ("Subject Function") for the first virtual AR avatar to perform during the interaction event. Next, the user selects an animation ("Target Function") for the second virtual AR avatar to perform in response to being interacted with by the Subject 522 (i.e., the first virtual AR avatar). Finally, the user selects the virtual joystick the User Interface 526 for controlling the Subject 522 (i.e., the selected virtual AR avatar). The parameters of the Virtual-Virtual interaction events may be saved to the memory 220 of the AR device 200 (e.g., in the form of a text file).

The method 300 continues with configuring the AR device and/or the interactive physical device(s) to define Physical-Virtual interaction events (block 320). Particularly, Physical-Virtual interaction events are interactions in which a physical device, such as one of the interactive physical device(s), triggers or controls an action of virtual content, such as one of the virtual AR avatar(s). The Physical-Virtual interaction events may generally take two forms: (1) those in which a sensor of an interactive physical device triggers a response from a virtual AR avatar and (2) those in which the user controls an interactive physical device and triggers a response from a virtual AR avatar.

In the case of creating Physical-Virtual interaction events of the first form (1) in which a sensor of an interactive physical device triggers a response from a virtual AR avatar, the interactive physical device must be programed to initiate or trigger the Physical-Virtual interaction using the virtual programming environment discussed above. Particularly, when programming the user-defined actions, operations, or functions, the user creates a sensor triggering function, which causes the control board 110 to transmit a command to the AR device 200 in response to a condition of sensor data received from a sensor (e.g., the ultrasonic sensor 130F of the electronics toolkit 100). In the programming of the sensor triggering function, the user selects the sensor that is to trigger the transmitting of the command to the AR device 200. Additionally, the user selects and/or defines a condition of the sensor data from the sensor that is to trigger the transmitting of the command to the AR device 200. As before, based on the user inputs to the visual programing environment, the processor of the AR device 200 or other computing device generates and compiles suitable program instructions/code for the control board 110 (e.g., Arduino code). The AR device 200 or other computing device transmits the compiled program code to the control board 110. The control board 110 receives the compiled program instructions/code via one of the communication devices 118 and stores the generated program instructions/code in the memory 116. In this way, interactive physical device is provided with a user-defined sensor triggering function that can be selected for triggering Physical-Virtual interaction events.

To create Physical-Virtual interaction events using story event planning tool, the user selects the interactive physical device as the Subject 522 and selects a virtual AR avatar as the Target 524. Next, to create a Physical-Virtual interaction event of the first form (1) in which a sensor of an interactive physical device triggers a response from a virtual AR avatar, the user selects the user-defined sensor triggering function ("Subject Function") for interactive physical device to trigger the interaction event. Alternatively, to create Physical-Virtual interaction event of the second form (2) in which the user controls an interactive physical device and triggers a response from the virtual AR avatar, the user selects one of the user-defined actions, operations, or functions ("Subject Function") that is to be controlled using the User Interface 526.

Next, the user selects an animation ("Target Function") for the virtual AR avatar to perform in response to being triggered by the Subject 522 (e.g., receiving the command from the interactive physical device or the user controlling the interactive physical device in a defined manner). Finally, if applicable, the user selects one of the virtual direction pad, the virtual slider, the virtual toggle button, and the action button the User Interface 526 for controlling the Subject 522 (i.e., the interactive physical device). The parameters of the Physical-Virtual interaction events may be saved to the memory 220 of the AR device 200 (e.g., in the form of a text file).

The method 300 continues with configuring the AR device and/or the interactive physical device(s) to define Physical-Physical interaction events (block 324). Particularly, as used herein, Physical-Physical interaction events are interactions in which a physical device, such as one of the interactive physical device(s), triggers or controls an operation of a physical device, such as the same or another of the interactive physical device(s). The Physical-Physical interaction events may generally take three forms: (A) those in which a sensor of an interactive physical device triggers a response from the same interactive physical device, (B) those in which a sensor of an interactive physical device triggers a response from a different interactive physical device, and (C) those in which the user controls an interactive physical device and triggers the response from another interactive physical device.

In the case of creating Physical-Physical interaction events of the first form (A) in which a sensor triggers a response from the same interactive physical device, the interactive physical device must be programed to initiate or trigger the Physical-Physical interaction using the virtual programming environment discussed above. Particularly, when programming the user-defined actions, operations, or functions, the user should create a sensor triggered operation. Particularly, the user programs the control board 110 to operate an electronic actuator (e.g., one of the motors 130A-E) to perform an operation in response to a condition of sensor data received from a sensor (e.g., the ultrasonic sensor 130F of the electronics toolkit 100). In the programming of the sensor triggered operation, the user selects the sensor that is to trigger the operation of the electronic actuator by the control board 110. Additionally, the user selects and/or defines a condition of the sensor data from the sensor that is to trigger the operation of the electronic actuator. As before, based on the user inputs to the visual programing environment, the processor of the AR device 200 or other computing device generates and compiles suitable program instructions/code for the control board 110 (e.g., Arduino code). The AR device 200 or other computing device transmits the compiled program code to the control board 110. The control board 110 receives the compiled program instructions/code via one of the communication devices 118 and stores the generated program instructions/code in the memory 116.

With again reference to FIG. 7, programming of an exemplary Physical-Physical interaction event of the first form (A) is shown. Particularly, the control board 110 is programed to, in response to an ultrasonic sensor sensing an object within 5 inches (visual code block 420), operate a servo motor to rotate 5 degrees (visual code block 422), wait 5 seconds (visual code block 424), and then operate a sound maker to play a noise with the pitch "E4" for 5 seconds (visual code block 426).

In the case of creating Physical-Physical interaction events of the second form (B) in which a sensor triggers a response from another interactive physical device, the interactive physical device must be programed to initiate or trigger the Physical-Virtual interaction using the virtual programming environment discussed above. Particularly, when programming the user-defined actions, operations, or functions, the user should create a sensor triggering function, which causes the control board 110 to transmit a command to the AR device 200 in response to a condition of sensor data received from a sensor (e.g., the ultrasonic sensor 130F of the electronics toolkit 100). In the programming of the sensor triggering function, the user selects the sensor that is to trigger the transmitting of the command to the AR device 200. Additionally, the user selects and/or defines a condition of the sensor data from the sensor that is to trigger the transmitting of the command to the AR device 200. As before, based on the user inputs to the visual programing environment, the processor of the AR device 200 or other computing device generates and compiles suitable program instructions/code for the control board 110 (e.g., Arduino code). The AR device 200 or other computing device transmits the compiled program code to the control board 110. The control board 110 receives the compiled program instructions/code via one of the communication devices 118 and stores the generated program instructions/code in the memory 116.

To create Physical-Physical interaction events using story event planning tool, the user selects the interactive physical device as the Subject 522 and selects another or the same interactive physical device as the Target 524. Next, to create a Physical-Physical interaction event of the second form (B) in which a sensor triggers a response from another interactive physical device, the user selects the user-defined sensor triggering function ("Subject Function") for interactive physical device to trigger the interaction event. Alternatively, to create Physical-Physical interaction event of the third form (C) in which the user controls an interactive physical device and triggers the response from another interactive physical device, the user select one of the user-defined actions, operations, or functions ("Subject Function") that is to be controlled using the User Interface 526.

Next, the user selects one of the user-defined actions, operations, or functions ("Target Function") for the interactive physical device to perform in response to being interacted with by the Subject 522 (e.g., receiving the command from the interactive physical device or the user controlling the interactive physical device in a defined manner). Finally, if applicable, the user selects one of the virtual direction pad, the virtual slider, the virtual toggle button, and the action button the User Interface 526 for controlling the Subject 522 (i.e., the interactive physical device). The parameters of the Physical-Physical interaction events may be saved to the memory 220 of the AR device 200 (e.g., in the form of a text file).

Figure 9:
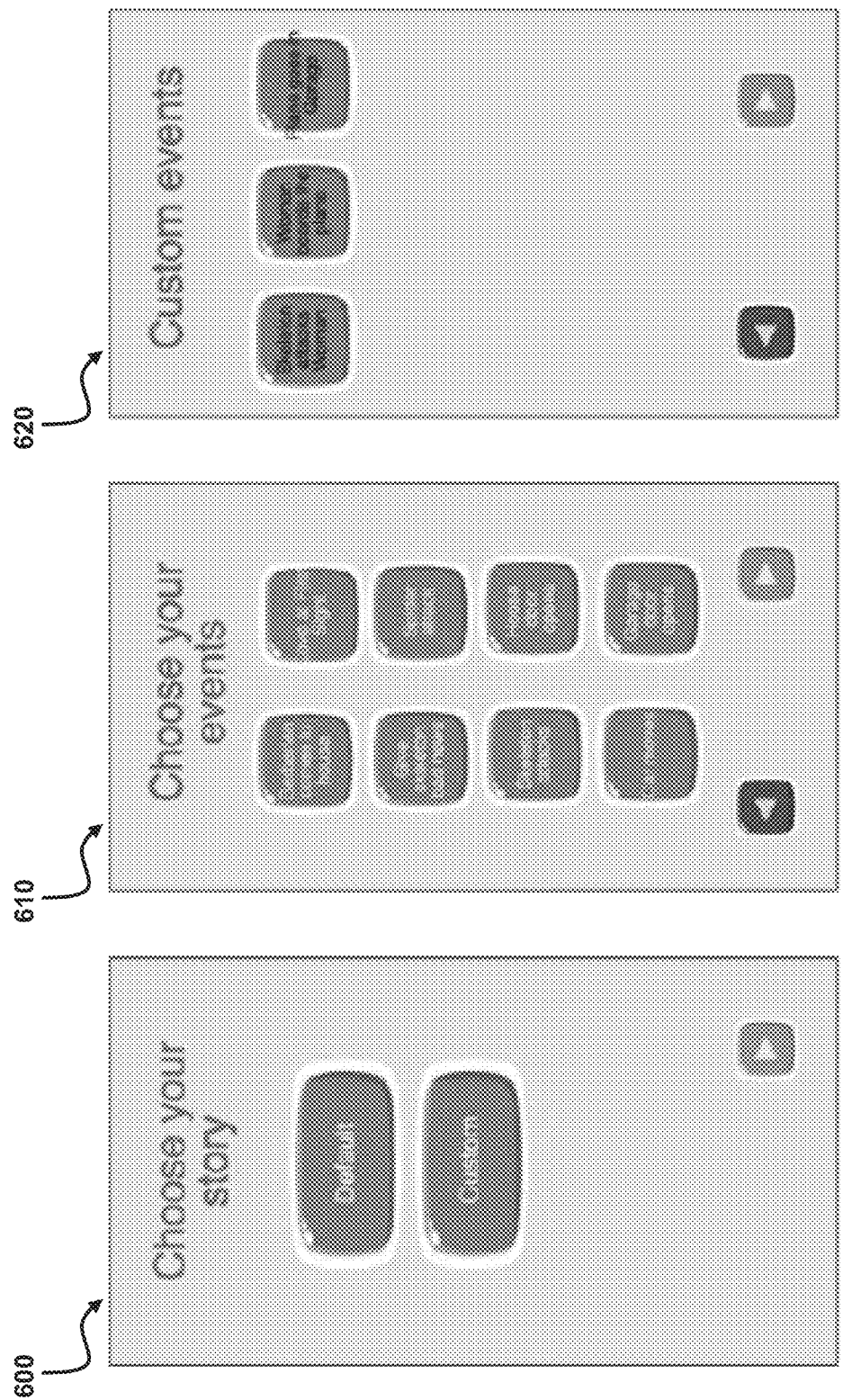
FIG. 9 shows exemplary graphical user interfaces of an AR storytelling application.

The method 300 continues with pairing the AR device to the interactive physical device(s) arranged in an environment (block 328). Particularly, the processor 210 of the AR device 200 operates one or more the communication devices 230 to communicatively pair with the control board 110 of each of the interactive physical device(s) that were constructed by the user. Next, processor 210 executes the AR storytelling application of the storytelling system to display a graphical user interface via which the user can select a set of interaction events that he or she would like use in his or her storytelling experience. FIG. 9 shows exemplary graphical user interfaces 600, 610, 620 of the AR storytelling application. Using the graphical user interface 600, the user can choose between using (i) a set of pre-made default interaction events relating the pre-made structures of the structure toolkit and (ii) selecting a custom set of the default and/or user-created interaction events. Using the graphical user interfaces 610 and 620, the user can choose a custom set of the default and/or user-created interaction events interaction events that he or she would like use in his or her storytelling experience.

The method 300 continues with displaying an AR graphical user interface including a virtual object superimposed upon the environment (block 332). Particularly, the processor 210 of the AR device executes a graphics engine of the AR storytelling application to generate, and display on the display screen 240, an AR user interface in which at least one virtual AR avatar (or other virtual AR object) is superimposed on images of the real-world environment (i.e., the virtual AR avatar(s) from the selected interaction events). In one embodiment, the user performs a setup process in which the AR device 200 maps the environment (e.g., using a SLAM technique) and the user interacts with the AR graphical user interface to (i) define the positions of the interactive physical device(s) within the mapped environment and (ii) places the virtual AR avatars are chosen positions within the mapped environment.

Figure 10:
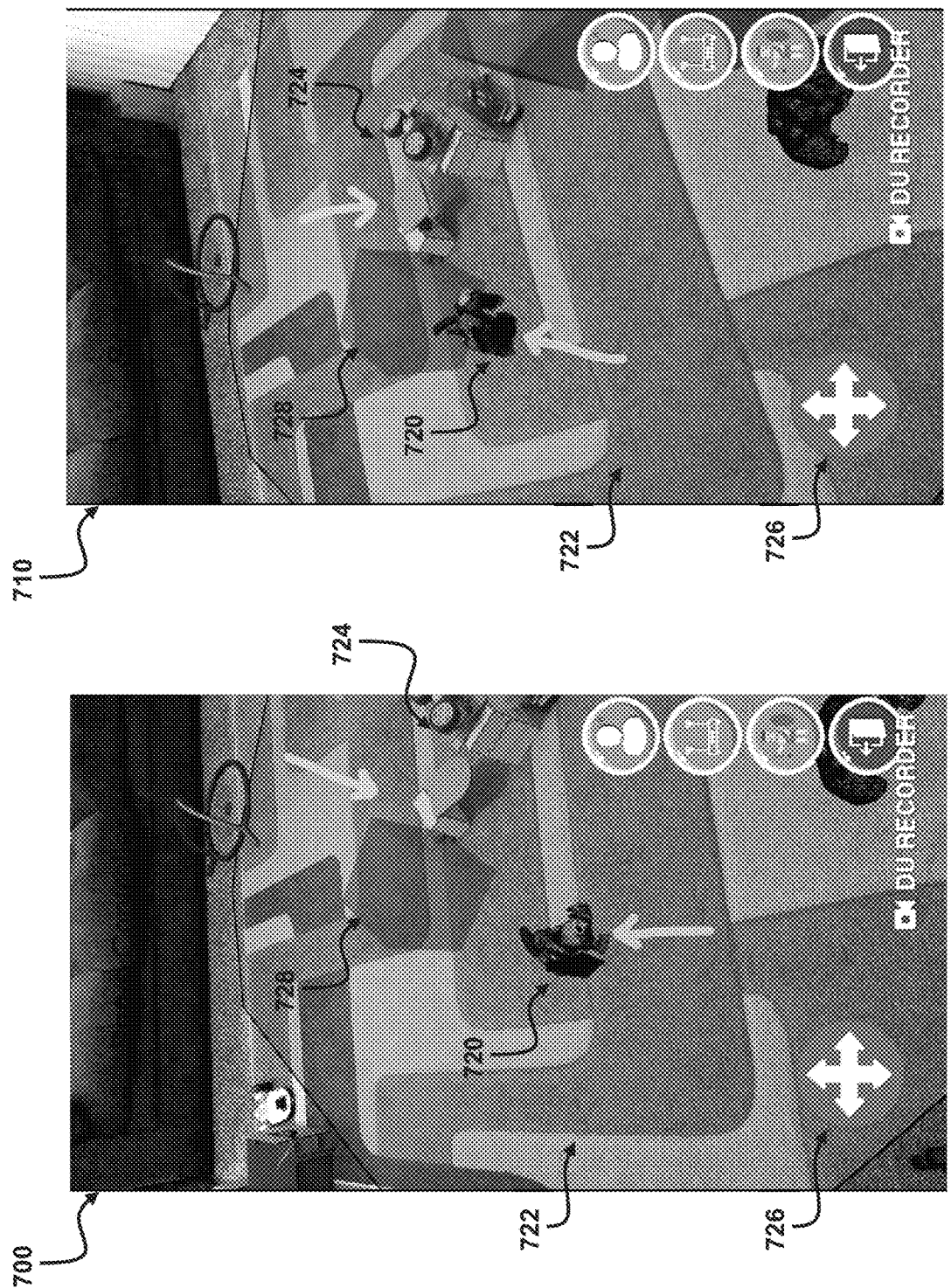
FIG. 10 shows exemplary AR graphical user interfaces in which a virtual avatar is superimposed on images of the real-world environment that includes an interactive physical device.

FIG. 10 shows exemplary AR graphical user interfaces 700, 710 in which a virtual avatar is superimposed on images of the real-world environment. As can be seen, the AR graphical user interfaces 700, 710 include a virtual AR avatar 720 (e.g., a warrior man) superimposed on images of the real-world environment 722. Additionally, an interactive physical component 724 can be seen in the images of the real-world environment 722.

The method 300 continues with controlling one of (i) the virtual object(s) and (ii) the interactive physical device(s) based on user inputs (block 336). Particularly, the AR graphical user interfaces of the AR storytelling application enable the user to move the virtual AR avatar (or other virtual object) around the real-world environment, to act out a story. Particularly, based on user inputs received via the user interface 270 (e.g., a touch screen component of the display screen 240) of the AR device 200, the processor 210 of the AR device 200 executes the graphics engine of the AR storytelling application to update, and display on the display screen 240, the AR graphical user interfaces such that the virtual AR avatar is moved around the real-world environment. To this end, with continued reference to FIG. 10, the AR graphical user interfaces 700, 710 include a virtual joystick 726 that can be manipulated by the user to move the virtual AR avatar throughout the real-world environment 722. In this way, the user can move the virtual AR avatar to trigger the Virtual-Physical and Virtual-Virtual interaction events defined above.

Additionally, the AR graphical user interfaces of the AR storytelling application enable the user to operate the interactive physical device(s), to act out the story. Particularly, based on user inputs received via the user interface 270 (e.g., a touch screen component of the display screen 240) of the AR device 200, the processor 210 operates one of the communications devices 230 to transmit commands to the control board 110 of the respective interactive physical device to cause the control board 110 to operate an electronic actuator to perform one of the user-defined functions, operations, and/or actions (e.g., rotate a wheels of interactive physical device). To this end, the AR graphical user interfaces 700, 710 include the virtual direction pad, the virtual slider, the virtual toggle button, and the action button (not shown) that can be manipulated by the user to operate the interactive physical device. In this way, the user can control the interactive physical device to trigger the Physical-Virtual and Physical-Physical interaction events defined above.

It should be appreciated that, the interactive physical device(s) and the virtual AR avatars (or other virtual objects) can be controlled by the user using a variety of additional control schemes aside from those described above. For example, in some embodiments, the virtual AR avatars (or other virtual objects) may be triggered to move throughout the real-world environment in an automated, scripted, or even random manner in response to a single tap or click from the user (e.g., the user taps on a location on his or her screen, which causes the virtual AR avatar to walk to that location automatically). As another example, in some embodiments, a virtual AR object may be triggered to move in an automated, scripted, or random manner through the real-world environment in response to a predetermined gesture (e.g., the user swipes his or her screen to perform a "throwing" gesture and a virtual AR projectile automatically flies across the real-world environment in along a trajectory defined by the gesture).

The method 300 continues with animating/operating another one of (i) the virtual object(s) and (ii) the interactive physical device(s) according to one of the defined interaction events (block 340). Particularly, the AR device 200 and the control board(s) 110 of the interactive physical device(s) to implement the user-created interaction events in response to being suitably triggered during the storytelling experience.

With respect to the user-created Virtual-Physical interaction events, the user moves the virtual AR avatar (or other virtual AR object) around the environment with a virtual joystick or equivalent virtual or physical user interface, as discussed above. Based on the movement of the virtual AR avatar, a Virtual-Physical interaction event may be initiated with respect to an interactive physical device. Particularly, in response to a predetermined movement of the virtual AR avatar in the real-world environment, the processor 210 operates one of the communication devices 230 to transmit a command to the control board 110 of the interactive physical device that is configured to respond to the predetermined movement of the virtual AR avatar, as defined by the Virtual-Physical interaction event. The command is configured to cause the control board 110 to control an electronic actuator to perform the selected user-defined action, operation, or function of the interactive physical device, as defined by the Virtual-Physical interaction event.

In some embodiments, the predetermined movement of the virtual AR avatar is a movement of the virtual AR avatar to a predetermined position in the real-world environment relative to the interactive physical device. Particularly, with reference to the AR graphical user interfaces 700, 710, a collider element 728 is shown near the interactive physical device 724. When the virtual AR avatar is moved into an area defined by the collider element 728, as shown in the AR graphical user interfaces 710, the Virtual-Physical interaction event with respect to the interactive physical device 724 is triggered.

In some embodiments, the triggering of the Virtual-Physical interaction event also causes the virtual AR avatar to perform an animation. Particularly, in response to the predetermined movement of the virtual AR avatar in the real-world environment, the processor 210 executes the graphics engine of the AR storytelling application to update, and display on the display screen 240, the AR graphical user interface such that the virtual AR avatar is animated to perform an action (e.g., a jump animation), as defined by the Virtual-Physical interaction event.

With respect to the user-created Virtual-Virtual interaction events, the user moves a first virtual AR avatar around the environment with a virtual joystick or equivalent virtual or physical user interface, as discussed above. Based on the movement of the first virtual AR avatar, a Virtual-Virtual interaction event may be initiated with respect to a second virtual AR avatar. Particularly, in response to a predetermined movement of the first virtual AR avatar in the real-world environment, the processor 210 executes the graphics engine of the AR storytelling application to update, and display on the display screen 240, the AR graphical user interface such that the second virtual AR avatar is animated to perform an action, as defined by the Virtual-Virtual interaction event.

In some embodiments, the predetermined movement of the first virtual AR avatar is a movement of the first virtual AR avatar to a predetermined position in the real-world environment relative to the second virtual AR avatar. Particularly, a collider element (similar to the collider element 728) is situated near the second virtual AR avatar. When the first virtual AR avatar is moved into an area defined by the collider element, the Virtual-Virtual interaction event with respect to the second virtual AR avatar is triggered.

In some embodiments, the triggering of the Virtual-Virtual interaction event also causes the first virtual AR avatar to perform an animation. Particularly, in response to the predetermined movement of the first virtual AR avatar in the real-world environment, the processor 210 executes the graphics engine of the AR storytelling application to update, and display on the display screen 240, the AR graphical user interface such that the first virtual AR avatar is animated to perform an action, as defined by the Virtual-Virtual interaction event.

With respect to the user-created Physical-Virtual interaction events of the first form (1) in which a sensor of an interactive physical device triggers a response from a virtual AR avatar, the control board 110 of the respective interactive physical device is configured to receive sensor data from the sensor and transmit a command to the AR device 200 in response to a condition of the sensor data, as programmed in the corresponding user-defined sensor triggering function of the interactive physical device. The AR device 200 receives the command from the control board 110 via one of the communication devices 230. In response to receiving the command, the processor 210 executes the graphics engine of the AR storytelling application to update, and display on the display screen 240, the AR graphical user interface such that the virtual AR avatar is animated to perform an action, as defined by the Physical-Virtual interaction event.

With respect to the user-created Physical-Virtual interaction events of the second form (2) in which the user controls an interactive physical device and triggers a response from the virtual AR avatar, the user controls one of the user-defined functions, operations, and/or actions of the respective interactive physical device using the virtual direction pad, the virtual slider, the virtual toggle button, and the action button, as discussed above. Based on the control of the interactive physical device, a Physical-Virtual interaction event may be initiated with respect to the virtual AR avatar. Particularly, in response to the respective interactive physical device being controlled to perform a predetermined operation, the processor 210 executes the graphics engine of the AR storytelling application to update, and display on the display screen 240, the AR graphical user interface such that the virtual AR avatar is animated to perform an action, as defined by the Physical-Virtual interaction event.

With respect to the user-created Physical-Physical interaction events of the first form (A) in which a sensor triggers a response from the same interactive physical device, the control board 110 of the respective interactive physical device is configured to receive sensor data from the sensor and control an electronic actuator to perform the selected user-defined action, operation, or function of the interactive physical device in response to a condition of the sensor data, as programmed in the corresponding user-defined sensor triggered operation of the interactive physical device.

With respect to the user-created Physical-Physical interaction events of the second form (B) in which a sensor triggers a response from another interactive physical device, the control board 110 of a first interactive physical device is configured to receive sensor data from the sensor and transmit first command to the AR device 200 in response to a condition of the sensor data, as programmed in the corresponding user-defined sensor triggering function of the interactive physical device. The AR device 200 receives the first command from the control board 110 via one of the communication devices 230. In response to receiving the first command from the first interactive physical device, the processor 210 operates one of the communication devices 230 to transmit a second command to the control board 110 of a second interactive physical device, as defined by the Physical-Physical interaction event. The second command is configured to cause the control board 110 of the second interactive physical device to control an electronic actuator to perform the selected user-defined action, operation, or function of the interactive physical device, as defined by the Physical-Physical interaction event.

With respect to the user-created Physical-Physical interaction events of the third form (C) in which the user controls an interactive physical device and triggers the response from another interactive physical device, the user controls one of the user-defined functions, operations, and/or actions of a first interactive physical device using the virtual direction pad, the virtual slider, the virtual toggle button, and the action button, as discussed above. Based on the control of the first interactive physical device, a Physical-Virtual interaction event may be initiated with respect to a second interactive physical device. Particularly, in response to the first interactive physical device being controlled to perform a predetermined operation, the processor 210 operates one of the communication devices 230 to transmit a command to the control board 110 of a second interactive physical device, as defined by the Physical-Physical interaction event. The command is configured to cause the control board 110 of the second interactive physical device to control an electronic actuator to perform the selected user-defined action, operation, or function of the interactive physical device, as defined by the Physical-Physical interaction event.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for providing an augmented reality storytelling experience, the method comprising:
   wirelessly pairing a transceiver of an augmented reality device with a first controller, the first controller being incorporated with a first physical device in a real-world environment and configured to control a first electronic actuator of the first physical device to perform a first operation of the first physical device;
   displaying, on a display screen of the augmented reality device, a first graphical user interface including a first virtual object superimposed on images of the real-world environment;
   updating, based on user inputs received via a user interface of the augmented reality device, the first graphical user interface to move the first virtual object around the real-world environment;
   transmitting, with the transceiver, a first command to the first controller in response to a first predetermined movement of the first virtual object in the real-world environment, the first command being configured to cause the first controller to control the first electronic actuator to perform the first operation of the first physical device;
   displaying, in the first graphical user interface on the display screen, a second virtual object superimposed on the images of the real-world environment; and
   updating, in response to a second predetermined movement of the first virtual object in the real-world environment, the first graphical user interface to animate the second virtual object to perform a second action, the second predetermined movement of the first virtual object being a movement of the first virtual object to a predetermined position in the real-world environment relative to the second virtual object.

2. The method of claim 1 further comprising:
   configuring, based on user inputs received via a second graphical user interface, the augmented reality device to transmit the first command the first controller in response to the first predetermined movement, the user inputs (i) selecting the first virtual object that is to trigger the transmitting of the first command, (ii) selecting the first physical device to which the first command is to be sent, and (iii) selecting the first operation of the first physical device to be performed in response to the first command.

3. The method of claim 1 further comprising:
updating, in response to the first predetermined movement of the first virtual object, the first graphical user interface to animate the first virtual object to perform a first action.

4. The method of claim 1, wherein the first predetermined movement of the first virtual object is a movement of the first virtual object to a predetermined area in the real-world environment relative to the first physical device.

5. The method of claim 1 further comprising:
configuring, based on user inputs received via a second graphical user interface, the augmented reality device to animate the second virtual object in response to the second predetermined movement, the user inputs (i) selecting the first virtual object that is to trigger the animation, (ii) selecting the second virtual object that is to be animated, and (iii) selecting the first action that is to be performed by the second virtual object in the animation.

6. The method of claim 1 further comprising:
generating, based on user inputs received via a visual programing environment, program instructions for the first controller to perform the first operation of the first physical device, the user inputs defining control parameters of the first electronic actuator for performing the first operation; and
downloading the program instructions to the first controller.

7. The method of claim 1, wherein the first physical device is constructed by the user using a predefined set of components including the first electronic actuator.

8. A method for providing an augmented reality storytelling experience, the method comprising:
wirelessly pairing a transceiver of an augmented reality device with a first controller, the first controller being incorporated with a first physical device in a real-world environment and configured to control a first electronic actuator of the first physical device to perform a first operation of the first physical device;
displaying, on a display screen of the augmented reality device, a first graphical user interface including a first virtual object superimposed on images of the real-world environment;
configuring, based on user inputs received via a second graphical user interface, the augmented reality device to animate the first virtual object in response to receiving a first command, the user inputs (i) selecting the first physical device that is to trigger the animation by transmitting the first command, (ii) selecting the first virtual object that is to be animated, and (iii) selecting a first action that is to be performed by the first virtual object in the animation;
receiving, with the transceiver of the augmented reality device, the first command from the first controller; and
updating, in response to receiving the first command, the first graphical user interface to animate the first virtual object to perform the first action.

9. The method of claim 8, wherein the first physical device includes a first sensor and the first controller is configured to (i) receive first sensor data from the first sensor and (ii) transmit the first command to the augmented reality device in response to a condition of the first sensor data.

10. The method of claim 9 further comprising:
generating, based on user inputs received via a visual programing environment, program instructions for the first controller to transmit the first command to the augmented reality device, the user inputs (i) selecting the sensor that is to trigger the transmitting of the first command and (ii) selecting the condition of the first sensor data that is to trigger the transmitting of the first command; and
downloading the program instructions to the first controller.

11. The method of claim 8, wherein the first physical device includes a first sensor and the first controller is configured to (i) receive first sensor data from the first sensor and (ii) control the first electronic actuator to perform the first operation in response to a condition of the first sensor data.

12. The method of claim 11 further comprising:
generating, based on user inputs received via a visual programing environment, program instructions for the first controller to perform the first operation of the first physical device in response to the first condition of the first sensor data, the user inputs (i) defining the condition of the first sensor data and (ii) defining control parameters of the first electronic actuator for performing the first operation; and
downloading the program instructions to the first controller.

13. The method of claim 8 further comprising:
wirelessly pairing the transceiver of the augmented reality device with a second controller, the second controller being incorporated with a second physical device in the real-world environment and configured to (i) receive second sensor data from a second sensor of the second physical device and (ii) transmit a second command to the augmented reality device in response to a condition of the second sensor data;
receiving, with the transceiver of the augmented reality device, the second command from the second controller; and
transmitting, with the transceiver, a third command to the first controller in response to receiving the second command, the third command being configured to cause the first controller to control the first electronic actuator to perform the first operation of the first physical device.

14. The method of claim 8 further comprising:
transmitting, based on user inputs received via a user interface of the augmented reality device, a fourth command to the first controller, the fourth command being configured to cause the first controller to control the first electronic actuator to perform the first operation of the first physical device.

15. The method of claim 14 further comprising:
wirelessly pairing the transceiver of the augmented reality device with a second controller, the second controller being incorporated with a second physical device in the real-world environment and configured to control a second electronic actuator of the second physical device to perform a second operation of the second physical device; and
transmitting, in response to the first physical device being controlled to perform a predetermine operation, a fifth command to the second controller, the fifth command being configured to cause the second controller to control the second electronic actuator to perform the second operation of the second physical device.

16. The method of claim 14 further comprising:
updating, in response to the first physical device being controlled to perform a predetermine operation, the first graphical user interface to animate the first virtual object to perform a second action.

17. The method of claim 8 further comprising:
generating, based on user inputs received via a visual programing environment, program instructions for the first controller to perform the first operation of the first physical device, the user inputs defining control parameters of the first electronic actuator for performing the first operation; and
downloading the program instructions to the first controller.

18. A method for providing an augmented reality storytelling experience, the method comprising:
wirelessly pairing a transceiver of an augmented reality device with a first controller, the first controller being incorporated with a first physical device in a real-world environment and configured to control a first electronic actuator of the first physical device to perform a first operation of the first physical device;
wirelessly pairing the transceiver of the augmented reality device with a second controller, the second controller being incorporated with a second physical device in the real-world environment and configured to (i) receive sensor data from a sensor of the second physical device and (ii) transmit a first command to the augmented reality device in response to a condition of the sensor data;
receiving, with the transceiver of the augmented reality device, the first command from the second controller; and
transmitting, with the transceiver, a second command to the first controller in response to receiving the first command, the second command being configured to cause the first controller to control the first electronic actuator to perform the first operation of the first physical device.

* * * * *